Nov. 3, 1964
D. W. FATH ETAL
3,155,277
MATERIAL HANDLING CONTROL SYSTEM
Filed Sept. 13, 1961
5 Sheets-Sheet 1
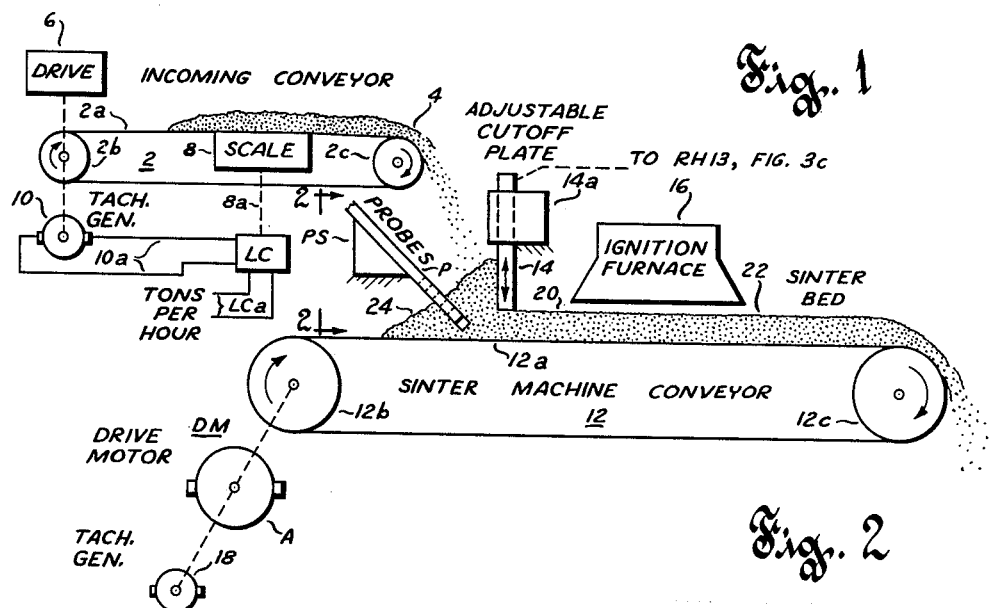
Fig. 1
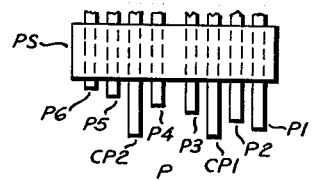
Fig. 2
Fig. 5
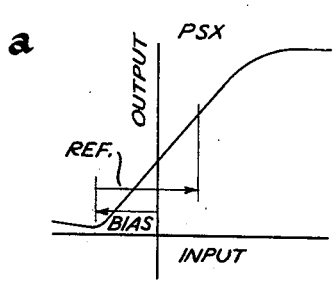
a
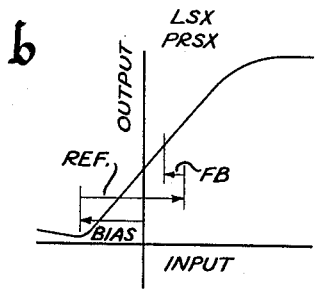
b
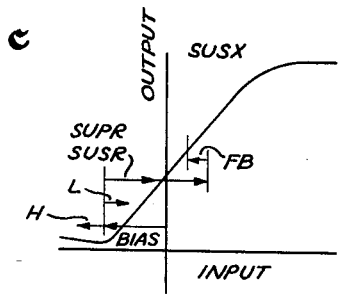
c
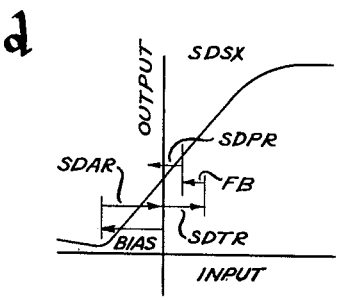
d

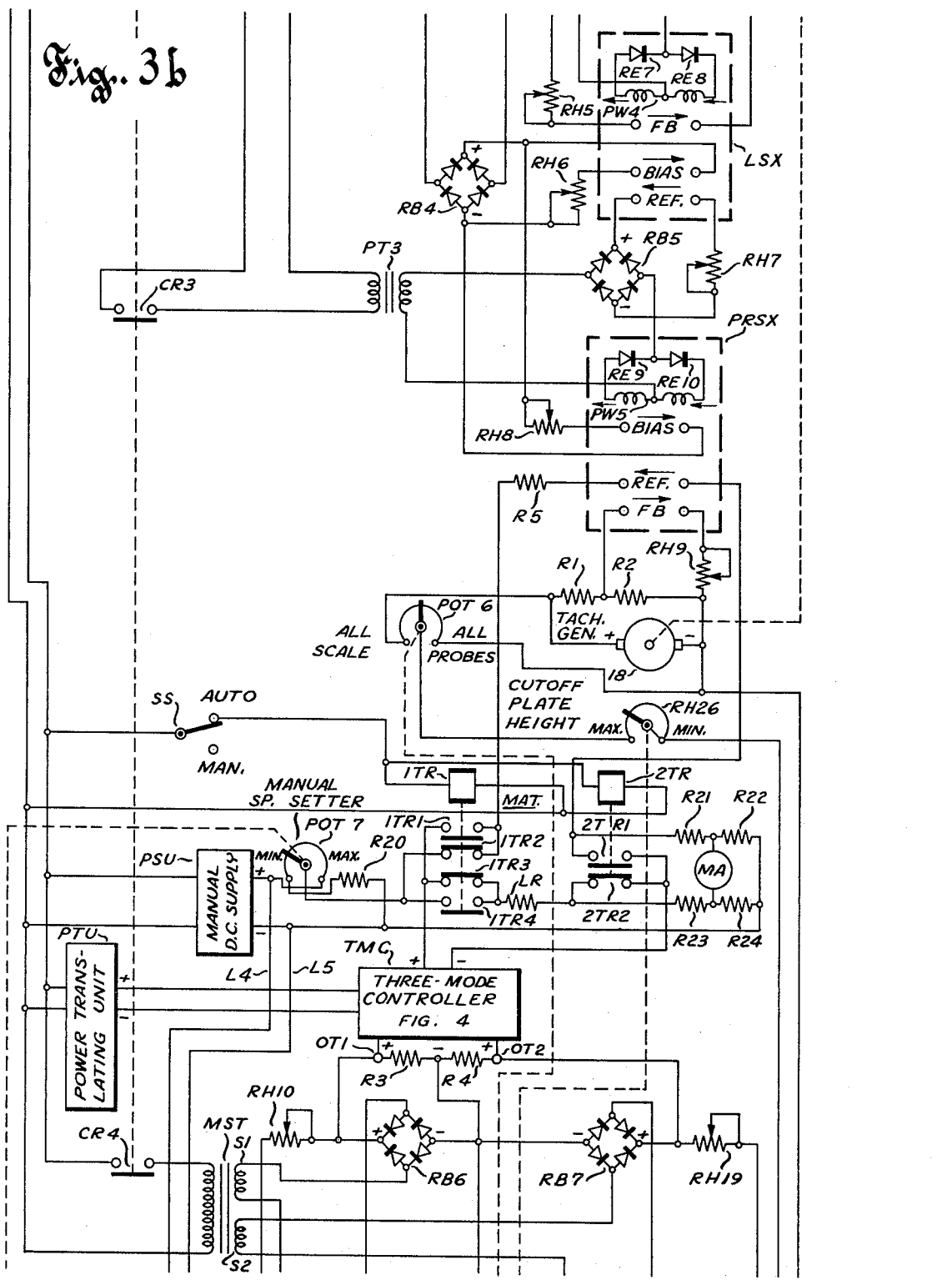

United States Patent Office 3,155,277
Patented Nov. 3, 1964

3,155,277
MATERIAL HANDLING CONTROL SYSTEM
Douglas W. Fath, Brookfield, Frank J. Kleewein and Theodore Kraschinsky, Milwaukee, Gene C. Lutsch, Hales Corners, and Carl J. Weiss, Milwaukee, Wis., assignors to Cutler-Hammer, Inc., Milwaukee, Wis., a corporation of Delaware
Filed Sept. 13, 1961, Ser. No. 138,239
21 Claims. (Cl. 222—55)

This invention relates to material handling control systems and more particularly to systems for controlling conveyance or dispensing of material at continuously controllable rates. A related application of the invention is to control of a motor and more particularly to control of a machine-driving electric motor in accordance with conditions controlled by the motor or external conditions or selected ratios of such motor controlled and external conditions.

While not limited thereto, the invention is especially applicable to control of an electric motor which drives a material conveyor such as a sinter machine conveyor or the like whereby the speed of the conveyor is adjusted and regulated in accordance with any one or a plurality of diverse, variable conditions. These variable conditions may comprise an external condition, as for example, the weight of material delivered to the sinter machine conveyor per unit of time and an internal or sinter machine controlled condition, as for example, the height of the material accumulated on the sinter machine conveyor.

An object of the invention is to provide an improved motor control system.

Another object of the invention is to provide an improved material handling control system.

A more specific object of the invention is to provide an improved control system arranged to respond to and to be controlled by two primary sources of input signal or selected portions thereof.

Another specific object of the invention is to provide an improved motor control system arranged to and to be controlled by two primary sources of input signal wherein provision is made for continuation of motor control by one of said sources if the other source discontinues or fails.

Another specific object of the invention is to provide an improved control system for a motor-driven machine wherein provision is made for control of the system by two diverse variable input signals and for utilization of said signals to afford smooth operational control whereby to afford minimum machine strain.

Another specific object of the invention is to provide for a material handling and dispensing system of the type wherein bulk material mix is accumulated in a pile from which it is disposed into a processing device, improved control means for maintaining the pile height at a selected level whereby to afford desired uniform compactness of the material entering such processing device.

A related object of the invention is to provide the aforementioned control means with selectively adjustable means for changing the pile height whereafter the control means automatically maintains the pile height at the new level.

Another specific object of the invention is to provide, for a material handling system of the type wherein electrically conductive material is dispensed, improved control means comprising electrically conductive material measuring probes and improved means associated therewith for rendering the probes contact sensitive, that is, sensitive to engagement of the material therewith.

Another object of the invention is to provide for a material handling system of the type having material height detecting means, improved control means enabling the operator to perform system compensating and control adjustments at a remote location without having to observe the material height.

Another object of the invention is to provide for a material handling system controlled jointly by first and second input control signals under automatic operation and having alternative automatic and manual control means comprising means for periodically adjusting a manual control signal during automatic operation to match an automatic control signal whereby to afford smooth transfer from automatic to manual control, improved means effective concurrently with such adjustment for maintaining system operational stability when the ratio of such input control signals is changed.

Another specific object of the invention is to provide, for a machine control system receiving an erratic weight-per-unit-of-time signal, improved means for utilizing a signal modifying controller whereby to shape such signal with respect to a plurality of characteristics thereof as to eliminate substantially the erratic characteristics of such signal.

Another specific object of the invention is to provide, for a machine control system receiving an external condition indicating signal having a stepped nature or the like, improved means for utilizing a signal modifying controller whereby to shape such signal with respect to a plurality of characteristics thereof as to afford smooth operational control of such machine.

Other objects and advantages of the invention will hereinafter appear.

According to the invention, there is provided a material mix dispensing motor control system for controlling operation of a sinter machine conveyor. An incoming conveyor discharges the material mix onto one end of the sinter machine conveyor in front of an adjustable cutoff plate which controls the depth of the material mix conveyed beneath an ignition furnace. Signal means such as a tachometer generator is provided for supplying a first signal proportional to the speed of the incoming conveyor. A scale is associated with the incoming conveyor for supplying a second signal proportional to the weight of material mix delivered per unit length of incoming conveyor. The first and second signals are mixed to provide a resultant signal proportional to the weight of material mix delivered per unit of time.

A plurality of probes are arranged ahead of the cutoff plate for measuring the height of the material mix pile at the entry end of the sinter machine conveyor. These probes vary control signals whenever the pile height varies from a normal selected level.

A control system is provided which utilizes the signals from the scale and probes and controls the speed of the sinter machine conveyor motor whereby to maintain the pile height at the selected level. This control system comprises manually adjustable electrical control means for changing the pile height by changing the speed of the sinter machine conveyor whereafter the system automatically maintains the pile height at the new level. The system also comprises manually adjustable electrical control means for setting the system for utilizing only the scale controlled signal or only the probes controlled signal or selected ratios thereof for control of the sinter machine conveyor speed. In this connection, either the scale controlled signal or the probes controlled signal is arranged to control the system if either such signal fails. The system further comprises a controller for so modifying the resultant of the scale and probes controlled signals as to afford minimum machine strain when the modified signal is used for sinter machine conveyor motor control. Provision is also made for readily adjusting the system if the cutoff plate height is changed whereby to preset the system automatically to maintain the pile height at the selected level during the new dispensing rate. Provision is further made for bypassing the probes one at a time and for simulating the electrical functions thereof so that the system can readily be operated and tested in the absence of material mix on the sinter machine conveyor. Moreover, provision is made for operating the sinter machine conveyor motor under manual control and for readily switching from automatic to manual control even if the motor is running. In this connection, indicator means is provided for monitoring periodic manual adjustment of the manual speed setter and the automatic operating speed compensation during automatic operation whereby frequently to preset the system for smooth transfer from automatic to manual control. During automatic operation, the manual speed control is connected to a load resistor and the periodic adjustments afford an indication of zero voltage difference between the automatic and manual controls at the switching point. In this manner, the sinter machine conveyor motor speed will not change when switching from automatic to manual operation. The manual speed setter and the automatic operating speed compensators are mechanically connected to one another for adjustment in unison. Due to this mechanical connection, the aforementioned periodic adjustments afford a desirable side effect which otherwise would require a separate device, that is, such adjustments to zero indication maintain system operational stability whenever the ratio of control by the scale and probes is changed. The system is additionally provided with manual pushbuttons for operating the system from local and remote stations and electroresponsive control means associated therewith for disconnecting supply voltage from the motor voltage amplifiers to prevent the output voltages of such amplifiers from erratic drifting before input signal control is established when the system is restarted.

The aforementioned and other objects and advantages of the invention and the manner of obtaining them will best be understood by reference to the following detailed description of an embodiment of a material handling control system taken in conjunction with the accompanying drawings, wherein:

FIGURE 1 is a schematic illustration in right side elevation of a sinter plant constructed in accordance with the invention;

FIG. 2 is a front view of the probes and their supporting structure taken along line 2—2 of FIG. 1;

Figure 3A:
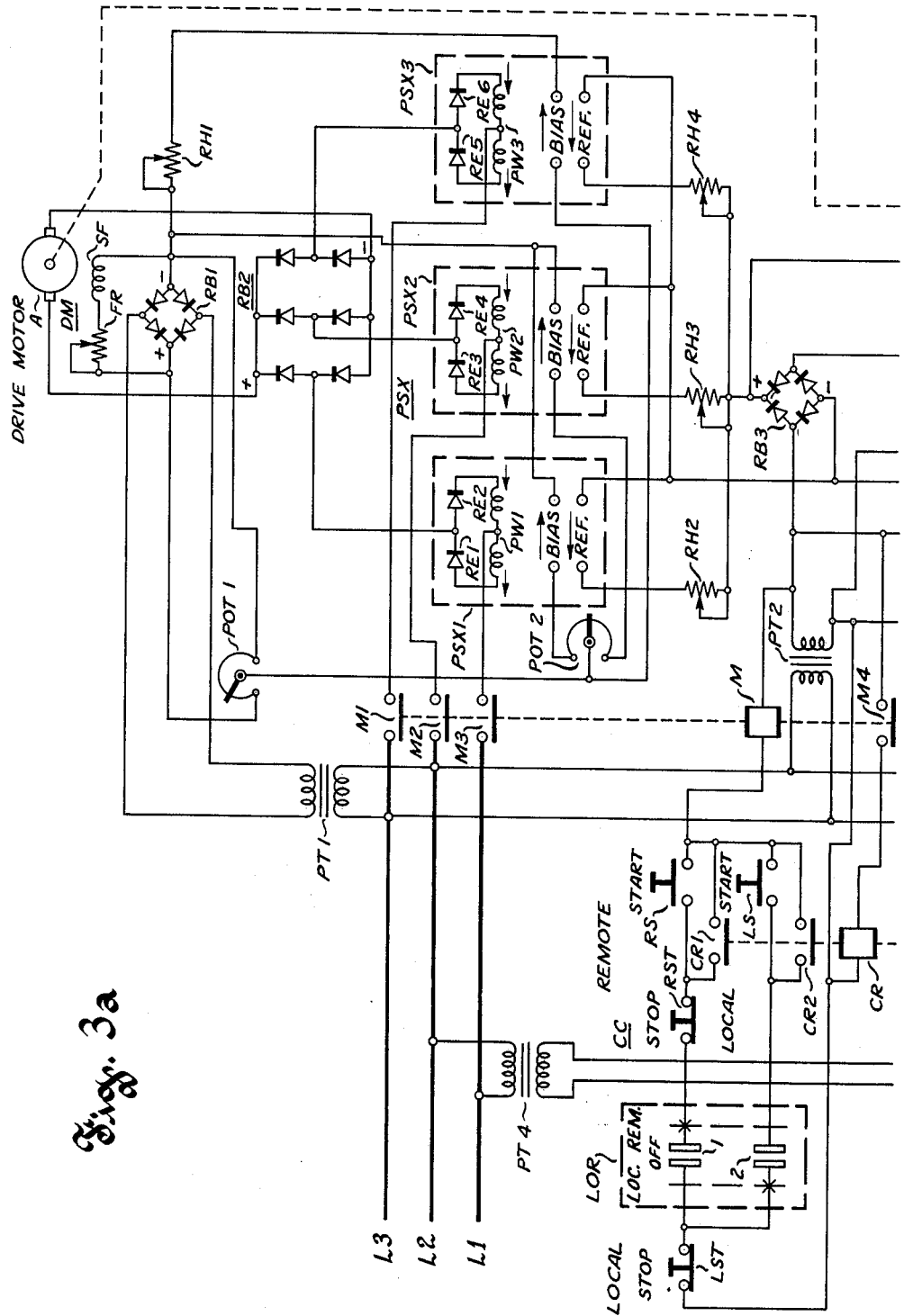
Figure 3C:
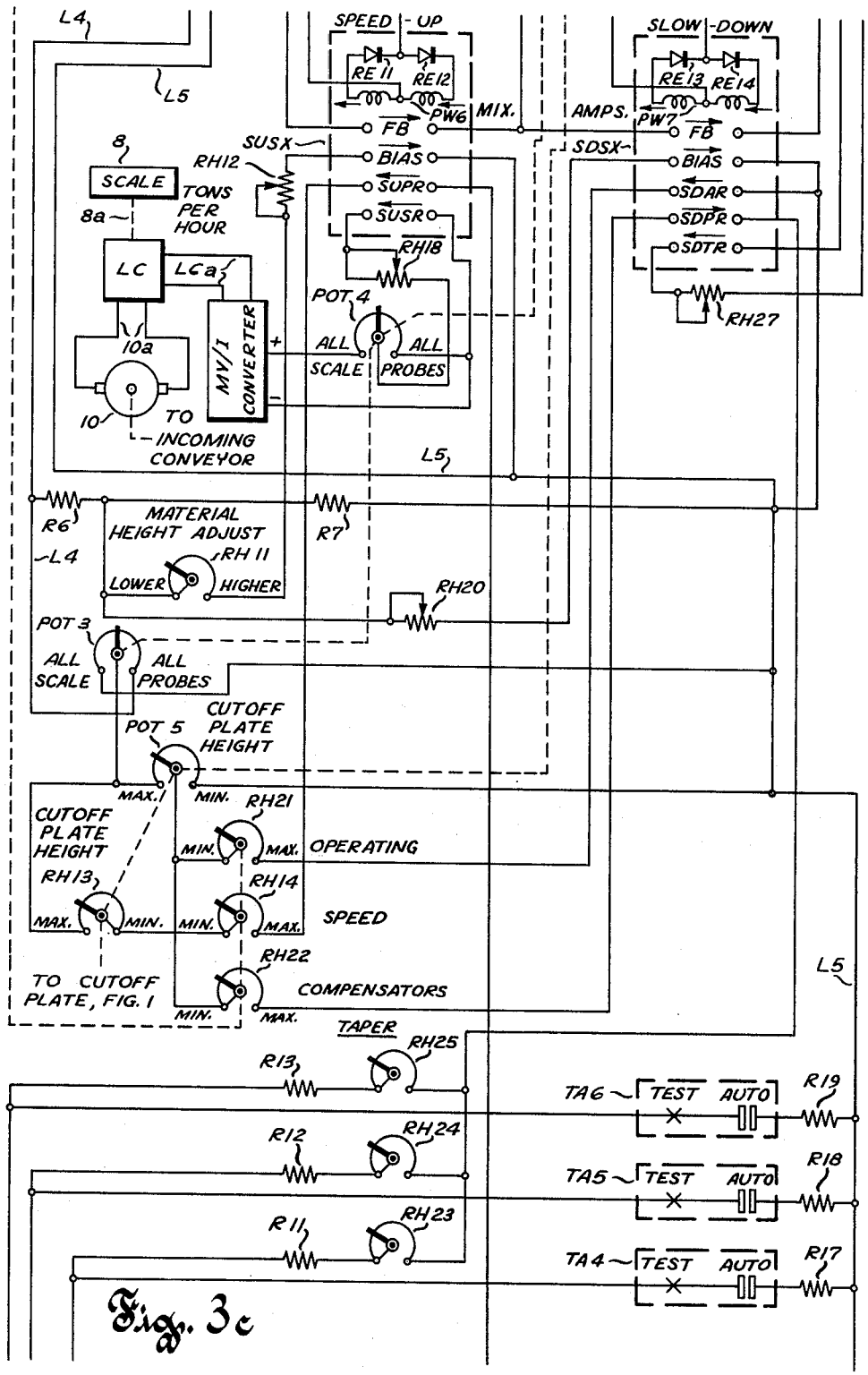
Figure 4:
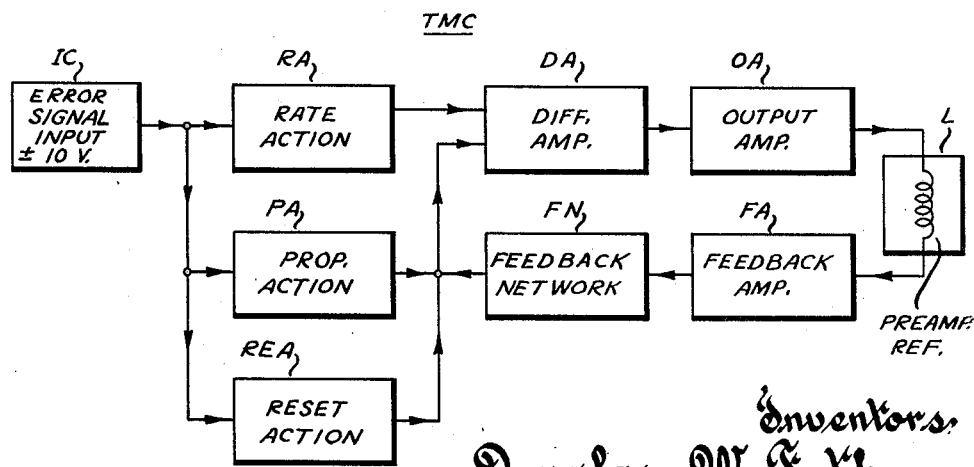

FIGS. 3a through 3d, when connected to one another in order, diagrammatically show a control system for the sinter machine conveyor drive motor of FIG. 1 constructed in accordance with the invention;

FIG. 4 is a schematic illustration of a three mode controller shown as a rectangle in FIG. 3b; and FIGS. 5a through 5d show output voltage curves of the magnetic amplifiers shown in FIGS. 3a, 3b and 3c and graphically illustrate operating characteristics thereof.

Referring to FIG. 1, there is shown schematically for exemplary purposes a material handling and processing system or machine with which the control system of the invention may be utilized. The system of FIG. 1 is provided with material input means and material dispensing and processing means. The material input means comprises an incoming conveyor 2 of the belt conveyor type or the like for conveying the material to be processed to the dispensing means. The material to be processed may be a mixture 4 of irregularly shaped and sized granular or pulverized and powdery material such as low grade iron ore or scrap or the like and limestone and other additives which must be processed or sintered in a sinter plant before it is utilized in a blast furnace in the making of steel.

Incoming conveyor 2 comprises an endless conveyor belt 2a arranged to travel over a pair of rotatable drums 2b and 2c which are spaced apart horizontally from one another. One of the drums such as drum 2b is arranged to be driven by any desired device or prime mover such as a drive 6 which may be an electric motor coupled to the drum shaft. Drive 6 is arranged to rotate drum 2b in the clockwise direction whereby the latter moves the upper portion of conveyor belt 2a in the right-hand direction to convey material mixture 4, hereinafter called material, to the dispensing means. While material 4 is shown in FIG. 1 as spilling from the right-hand end of conveyor 2 directly onto the dispensing means hereinafter described, it will be understood that the material may actually be discharged from the incoming conveyor into an intermediate collecting device or hopper. Such hopper may be of the drum feeder or swinging spout type or the like to afford feeding of the material to the dispensing means in a controlled manner.

Means are provided in association with the incoming conveyor for measuring the amount of material conveyed by the latter to the processing machine. This means comprises means for measuring the material by weight per unit of time or the like such as a scale 8 arranged beneath the upper portion of belt 2a for measuring by weight the material being conveyed. A load cell LC is mechanically associated with scale 8 as shown by broken line 8a. Load cell LC is preferably of the strain gauge bridge type or the like which is energized from an electric source as shown in FIG. 1. The electric source is preferably a direct current tachometer generator 10 arranged to be driven by the incoming conveyor. Tachometer generator 10 may be coupled to the shaft of drum 2b to be rotated thereby. The electrical output of the tachometer generator is connected by a pair of conductors 10a to load cell LC to energize the latter. Load cell LC is mechanically strained by scale 8 to provide an electric signal proportional in a characteristic thereof such as magnitude or the like at any instant to the weight per unit length of the material over scale 8. The energization of load cell LC afforded by tachometer generator 10 is proportional to the speed of the incoming conveyor. Thus, there are provided means to afford an electrical signal indicative of or proportional to the weight of the material passing over the scale and means to afford an electric signal indicative of or proportional to the speed of the conveyor. These signals are combined in the circuit of load cell LC to afford at conductors LCa an electric signal indicative of or proportional to the weight of material being conveyed per unit of time. The signal afforded by load cell LC may, for example, be proportional to tons of material conveyed per hour.

The aforementioned material dispensing means comprises a conveyor 12 such as a sinter machine conveyor and an adjustable cutoff plate 14 and the aforementioned material processing means comprises the right-hand portion of conveyor 12 and an ignition furnace 16. Conveyor 12 comprises an endless conveyor device such as pallets 12a or the like arranged to travel over a pair of rotatable drums 12b and 12c or the like which are spaced apart horizontally from one another. One of the drums such as drum 12b is arranged to be driven in the clockwise direction by an armature A of an electric drive motor DM whereby the drum drives or pushes the upper portion of conveyor device 12a in the right-hand direction to convey the material under cutoff plate 14 and beneath ignition furnace 16. A tachometer generator 18 is coupled to the shaft of drive motor DM to be driven thereby to afford an actual speed signal hereinafter described. Cutoff plate 14 is preferably as wide as conveyor 12 and serves to restrict the depth of the material conveyed beneath the ignition furnace. Cutoff plate 14 is rigidly held in stationary mounting member 14a and preferably is arranged to be adjusted up or down to afford adjustment or change of the depth of the material 20 between predetermined limits. For example, the cutoff plate may be arranged so that it can be adjusted continuously or in steps to vary the depth of the material 20 from a minimum of seven inches to a maximum of sixteen inches. Ignition furnace 16 is utilized in known manner to process the material by igniting the same and causing the material to burn to provide a sinter bed 22 which is conveyed away by the right-hand end of the conveyor.

As shown in FIG. 1, the right-hand end of the incoming conveyor overlies the left-hand end of sinter machine conveyor 12 whereby the material to be processed is discharged from the incoming conveyor onto the sinter machine conveyor adjacent to the left-hand end of the latter in front of the cutoff plate. The material is arranged to accumulate in an inclined surface pile 24 against the lower front surface of the cutoff plate and the speed of conveyor 12 is controlled so that an ample supply of material of desired or optimum compactness is maintained in front of the cutoff plate at all times. This affords the material bed 20 which passes under the ignition furnace a uniform thickness or depth and an optimum compactness. For this purpose, there are provided means for continuously detecting or measuring the height of material in front of the cutoff plate. This means comprises a plurality of electrically conducting probes P rigidly mounted on a stationary probe support PS and extending from the latter toward and into the pile of material. Probes P are arranged at an angle to the vertical cutoff plate such that the probes extend toward and into the pile 24 of material substantially perpendicular to the upper inclined surface of the pile. While the means for measuring or detecting the material height has been shown as comprising probes, it will be understood that the invention contemplates use of other means therefor such as radiant energy pile height detecting devices or the like.

Figure 3D:
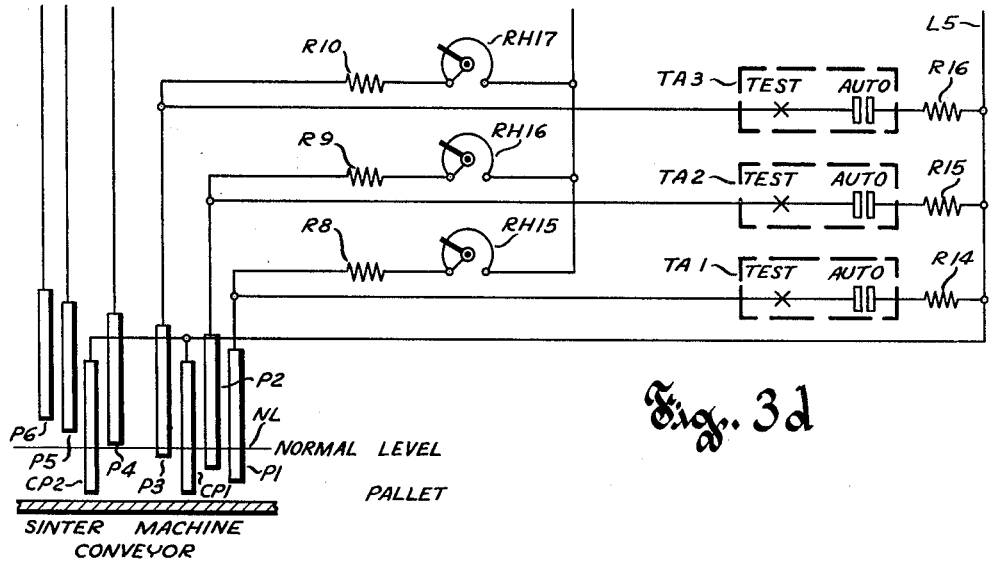

As shown in FIG. 2 wherein probes P are shown as being viewed in left side elevation along line 2—2 of FIG. 1, the probes comprise a plurality of measuring probes P1 through P6 and a pair of common probes CP1 and CP2. Measuring probes P1 through P6 are preferably of equal length and are set in their supporting structure so that the lower tips thereof are at uniformly increasing heights above conveyor 12. Common probes CP1 and CP2 are preferably of the same length as the measuring probes and are set in their supporting structure so that the lower tips thereof are an equal distance below the lower tip of the lowest measuring probe P1. The probes are arranged across the conveyor 12 and are further arranged in two groups with one such group being arranged adjacent each side of the conveyor. The first group preferably comprises probes P1, P2, CP1 and P3 arranged in that order from one side of the conveyor toward the middle thereof. The other group preferably comprises probes P4, CP2, P5 and P6 arranged in that order from an intermediate point of the conveyor to the other side. Two common probes CP1 and CP2 are preferably employed rather than a single common probe to avoid excessive electrically conductive distances through the material from the respective measuring probes of each group to the associated common probe. The probes are arranged so that the normal level NL of the material in pile 24 is at the point shown by the horizontal line in FIG. 3d. As will be apparent, common probes CP1 and CP2 are always immersed in pile 24. When the material is at its normal level NL, the three lower measuring probes P1, P2 and P3 are also immersed in or in engagement with the material whereas the three higher measuring probes P4, P5 and P6 are free from engagement with the material. That is, the material engages probe P3 but does not engage probe P4 as shown in FIG. 3d. However, the level of the material can be changed from normal level NL to any point between the lower ends of probes CP1 and CP2 and a level wherein probe P6 is embedded as hereinafter described. At the normal level shown in FIG. 3d, electrically conducting paths extend from probes P1, P2 and P3 through the material to common probe CP1.

Referring to FIGS. 3a through 3d, there is shown a control system for sinter machine conveyor drive motor DM. Drive motor DM is preferably of the direct current type or the like having an armature winding A and a shunt field winding SF. Means are provided for supplying operating electrical power to the control system. As shown in FIG. 3a, this means comprises power supply lines L1, L2 and L3 which are connectable to a three-phase alternating current power supply source through the usual disconnect switch and protective devices, not shown. Means are provided for energizing shunt field winding SF with unidirectional current. This means comprises a power transformer PT1 having its primary winding connected to lines L2 and L3 and having its secondary winding connected to the input terminals of a rectifier bridge RB1, the positive and negative output terminals of which are connected to shunt field winding SF and there being a field rheostat FR between an output terminal of bridge RB1 and one side of the shunt field winding to afford adjustment of the motor field energization.

Means are provided for controllably energizing armature winding A of drive motor DM. This means comprises a three-phase power amplifier PSX of the magnetic type having three magnetic amplifiers PSX1, PSX2 and PSX3 one for each phase of the supply connectable to power supply lines L1, L2 and L3 through normally open contacts M1, M2 and M3 of a main power contactor M. Magnetic amplifiers PSX1, PSX2 and PSX3 are connected through a three-phase rectifier bridge RB2 across armature winding A of the motor. Each amplifier PSX1, PSX2 and PSX3 is provided with a pair of power windings PW1, PW2 and PW3, a pair of half-wave rectifiers RE1–RE2, RE3–RE4 and RE5–RE6 with one such rectifier in series connection with each power winding of each pair to afford self-saturation of the amplifier, a bias winding BIAS and a reference or input signal control winding REF.

The power windings when energized tend to turn the amplifiers "on" as shown by the arrows adjacent thereto pointing in the left-hand direction. The bias windings when energized, bias the amplifiers to cutoff as shown by the arrows adjacent thereto pointing in the opposite or right-hand direction to provide a reference point for control of the amplifiers. The reference windings when energized by application of control or input signals turn the amplifiers "on" controllable or adjustable amounts from the cutoff point.

Means are provided for adjustably energizing the bias windings. These means comprise a potentiometer POT1 having its resistor connected across the positive and negative output terminals of rectifier bridge RB1. An adjustable arm of potentiometer POT1 is connected through the bias winding of amplifier PSX3 and a rheostat RH1 in series to the negative output terminal of bridge RB1. The adjustable arm of potentiometer POT1 is also connected through an adjustable arm and the upper portion of the resistor of a potentiometer POT2 and the bias winding of amplifier PSX1 to the negative terminal of bridge RB1. The adjustable arm of potentiometer POT1 is further connected through the adjustable arm and the lower portion of the resistor of potentiometer POT2 and the bias winding of amplifier PSX2 to the negative terminal of bridge RB1.

A level amplifier LSX, shown in FIG. 3b, of the magnetic preamplifier or intermediate amplifier type is provided for controlling the signal level applied to the three-phase power amplifier. Level amplifier LSX is connected to power supply lines L2 and L3 through a power transformer PT2. Level amplifier LSX is connected through a rectifier bridge RB3 to reference windings REF of amplifiers PSX1, PSX2 and PSX3 in parallel, there being rheostats RH2, RH3 and RH4 between an output terminal of bridge RB3 and the respective reference windings of amplifiers PSX1, PSX2 and PSX3 to afford adjustment of the relative energizations thereof. Level amplifier LSX is provided with a pair of power windings PW4, a pair of half-wave rectifiers RE7 and RE8 with one such rectifier in series with each power winding for self-saturation purposes, a feedback winding FB, a bias winding BIAS and a reference or input signal control winding REF. Feedback winding FB is connected in series with a rheostat RH5 across the positive and negative output terminals of bridge RB3 to afford adjustable negative ampere-turns for the amplifier. The bias winding of amplifier LSX is energized from the secondary winding of transformer PT2 through a rectifier bridge RB3, there being a rheostat RH6 in series with the bias winding between one side of the latter and an output terminal of bridge RB4 to afford adjustment of the bias.

The power windings PW4 when energized tend to turn the level amplifier "on" as shown by the arrows adjacent thereto pointing in the left-hand direction. Bias winding BIAS when energized biases the level amplifier to cutoff as shown by the arrow adjacent thereto to provide a reference point from which the amplifier is controlled by the reference winding. Reference winding REF of the level amplifier when energized by application of control or input signals turns the amplifier "on" a controllable or adjustable amount from the cutoff point as shown by the arrow adjacent thereto. Feedback winding FB when energized supplies negative ampere-turns to the level amplifier in a direction shown by the arrow adjacent thereto tending to turn the amplifier toward "off" to stabilize its operation.

A preamplifier PRSX shown in FIG. 3b of the magnetic type is provided for controlling level amplifier LSX. The preamplifier is connectable to power supply lines L2 and L3 through a power transformer PT3 and a normally open contact CR3 of a control relay CR. The preamplifier is connected through a rectifier bridge RB5 to reference winding REF of level amplifier LSX, there being a rheostat RH7 between one side of such reference winding and an output terminal of bridge RB5 to afford adjustment of the energization thereof. The preamplifier is provided with a pair of power windings PW5, a pair of half-wave rectifiers RE9 and RE10 with one such rectifier in series with each power winding for self-saturation purposes, a bias winding BIAS, a reference winding REF and a feedback winding FB. The bias winding is connected in series with a rheostat RH8 across the positive and negative output terminals of rectifier bridge RB4 for adjustable energization. Feedback winding FB is energized from tachometer generator 18. To this end, a voltage divider comprising resistors R1 and R2 in series is connected across the armature winding of generator 18. Feedback winding FB is connected in series with a rheostat RH9 across resistor R2 of the voltage divider, rheostat RH9 affording adjustment of the feedback.

The power windings PW5 when energized tend to turn the preamplifier "on" as shown by the arrows adjacent thereto pointing in the left-hand direction. Bias winding BIAS when energized biases the preamplifier to cutoff as shown by the arrow adjacent thereto pointing in the opposite or right-hand direction to provide a reference point from which the preamplifier is controlled by the reference winding. Reference winding REF when energized by application of control or input signals thereto turns the preamplifier "on" a controllable or adjustable amount from the cutoff as shown by the arrow adjacent thereto pointing in the left-hand direction. Feedback winding FB, when energized by tachometer generator 18 in accordance with the speed of motor DM, supplies negative ampere-turns in a direction shown by the arrow adjacent thereto tending to turn the preamplifier toward "off" for motor speed regulation purposes.

A pair of mixing amplifiers shown in FIG. 3c and comprising a speed-up amplifier SUSX and a slow-down amplifier SDSX of the magnetic type are provided for controlling reference winding REF of preamplifier PRSX in an automatic manner. Alternatively, the preamplifier reference winding is adjustably energizable under manual control as hereinafter described. Speed-up amplifier SUSX is connected to power supply lines L1 and L2 through a first secondary winding S1 and the primary winding of a regulated, current-limiting transformer MST, a normally open contact CR4 of control relay CR and a power transformer PT4. Slow-down amplifier SDSX is connected to power supply lines L1 and L2 through a secondary winding S2 and the primary winding of transformer MST, contact CR4 and power transformer PT4. Speed-up amplifier SUSX is connected through a rectifier bridge RB6 across a mixing resistor R3. Slow-down amplifier SDSX is connected through a rectifier bridge RB7 across a mixing resistor R4, resistors R3 and R4 being in series connection between output terminals OT1 and OT2. Output terminals OT1 and OT2 are connected to a three-mode controller TMC which in turn is connectable through a manual to automatic transfer switching circuit MAT hereinafter described across reference winding REF of preamplifier PRSX, there being a resistor R5 between one end of such reference winding and circuit MAT. Supply lines L1 and L2 are connected through transformer PT4 to a power translating unit PTU. The positive and negative output terminals of unit PTU are connected to three mode controller TMC to supply the latter with amplified unidirectional supply voltage.

Speed-up amplifier SUSX is provided with a pair of power windings PW6, a pair of half-wave rectifiers RE11 and RE12 with one such rectifier in series with each power winding for self-saturation purposes, a feedback winding FB, a bias winding BIAS, a speed-up probe reference winding SUPR and a speed-up scale reference winding SUSR. Feedback winding FB is connected in series with a rheostat RH10 across the positive and negative output terminals of rectifier bridge RB6. The bias winding and speed-up probe reference winding are energized by rectified power from lines L1 and L2. To this end, power supply lines L1 and L2 are connected through transformer PT4 to energize a direct current power supply unit PSU which translates and rectifies the alternating current power to afford rectified, regulated unidirectional power across positive and negative direct current conductors L4 and L5. A voltage divider comprising resistors R6 and R7 in series is connected across conductors L4 and L5. The junction of resistors R6 and R7 is connected through a material height adjust rheostat RH11 and rheostat RH12 and bias winding BIAS of speed-up amplifier SUSX to conductor L5 to afford an adjustable energizing circuit for the bias winding for reasons hereinafter described.

As hereinafter more fully described, the energizing circuit of bias winding BIAS of the speed-up amplifier includes means for adjusting the height of the material pile 24 relative to the probes whereby the probes need not be adjusted up or down to accomplish the same. That is, the aforementioned circuit includes adjustable means for causing the material pile to increase or decrease in depth at the probes whereafter the pile will automatically be maintained at the new depth. This means comprises rheostat RH11 in series connection with bias winding BIAS of the speed-up amplifier which may be adjusted manually to cause the material pile either to increase or decrease in height.

A scale-probes selecting potentiometer POT3 has its resistor connected across conductors L4 and L5. The movable arm of potentiometer POT3 is connected through a cutoff plate height rheostat RH13, an operating speed compensator rheostat RH14, speed-up probe reference winding SUPR, and then in three parallel circuits through taper rheostats RH15, RH16 and RH17, respectively, in series with high resistors R8, R9 and R10 to measuring probes P1, P2 and P3, respectively. The three electrical circuits extend from the measuring probes through the material in which they are embedded to common probe CP1 which is connected directly to conductor L5. As will be apparent, speed-up probe reference winding SUPR is energized by a signal controlled by the probes. On the other hand, speed-up scale reference winding SUSR is energized by a signal controlled by the aforementioned scale 8. To this end, load cell LC is energized by tachometer generator 10 and is stressed by scale 8 to afford at output conductors 10a a signal proportional to tons per hour. Conductors LCa are connected to a millivolt to current converter MV/I of the amplifying type. The positive and negative output conductors of converter MV/I are connected across the resistor of a scale-probes selecting potentiometer POT4. The movable arm of potentiometer POT4 is connected through a rheostat RH18 and speed-up scale reference winding SUSR to the negative conductor of converter MV/I.

Power windings PW6 when energized tend to turn the speed-up amplifier "on" as shown by the arrows adjacent thereto pointing in the left-hand direction. Bias winding BIAS when energized biases the speed-up amplifier to cutoff as shown by the arrow adjacent thereto pointing in the opposite direction to provide a reference point from which the amplifier is controlled by input signal windings. The input signal windings comprising speed-up probe reference winding SUPR and speed-up scale reference winding SUSR when energized by control or input signals turn the speed-up amplifier "on" a controllable or adjustable amount from the cutoff point as shown by the arrows adjacent thereto. Feedback winding FB, when energized by the amplifier output, supplies negative ampere-turns in a direction shown by the arrow adjacent thereto tending to turn the speed-up amplifier a small amount toward "off" to stabilize its operation.

Slow-down amplifier SDSX is provided with a pair of power windings PW7, a pair of half-wave rectifiers RE13 and RE14 with one such rectifier in series with each power winding for self-saturation purposes, a feedback winding FB, a bias winding BIAS, a slow-down auxiliary reference winding SDAR, a slow-down probe reference winding SDPR and a slow-down tachometer reference winding SDTR. Feedback winding FB is connected through a rheostat RH19 across the positive and negative output terminals of rectifier bridge RB7. The junction of voltage divider resistors R6 and R7 is connected through a rheostat RH20 and bias winding BIAS to conductor L5. Slow-down auxiliary reference winding SDAR and slow-down probe reference winding SDPR are energized from potentiometer POT3. To this end, the movable arm of potentiometer POT3 is connected through the resistor of a cutoff plate height potentiometer POT5 to conductor L5. The movable arm of potentiometer POT5 is connected through an operating speed compensator rheostat RH21 and slow-down auxiliary reference winding SDAR to conductor L5. The movable arm of potentiometer POT5 is also connected through an operating-speed compensator rheostat RH22, a slow-down probe reference winding SDPR and then in three parallel circuits through taper rheostats RH23, RH24 and RH25, respectively, in series with high resistors R11, R12 and R13, to measuring probes P4, P5 and P6, respectively. Common probe CP2 associated with the last mentioned measuring probes is connected directly to conductor L5. It will be apparent that the three aforementioned parallel circuits are interrupted when the material is at normal level NL so that slow-down probe reference winding SDPR is not energized except when the material rises above the normal level and engages one or more of the probes P4, P5 and P6. Slow-down tachometer reference winding SDTR is energized from the armature winding of tachometer generator 18 when sinter machine conveyor 12, FIG. 1, is running. To this end, a scale-probes selecting potentiometer POT6 has its resistor connected across the armature winding of tachometer generator 18. The movable arm of potentiometer POT6 is connected through a cutoff plate height rheostat RH26, slow-down tachometer reference winding SDTR and rheostat RH27 to the negative side of the armature winding of tachometer generator 18.

Power windings PW7 when energized tend to turn the slow-down amplifier "on" as shown by the arrows adjacent thereto pointing in the left-hand direction. Bias winding BIAS when energized biases the slow-down amplifier to cutoff as shown by the arrow adjacent thereto pointing in the opposite direction to provide a reference point from which the amplifier is controlled by control and input signal windings. The control and input signal windings comprise slow-down auxiliary reference winding SDAR, slow-down probe reference winding SDPR and slow-down tachometer reference winding SDTR. Slow-down auxiliary reference winding SDAR and slow-down tachometer reference winding SDTR when energized by control current and tachometer feedback current, respectively, turn the slow-down amplifier "on" a controllable or adjustable amount from the cutoff point as shown by the arrows adjacent thereto. Slow-down probe reference winding SDPR when energized by a control or input signal turns the amplifier toward "off" a controllable or adjustable amount as shown by the arrow adjacent thereto. Feedback winding FB when energized by the amplifier output supplies negative ampere-turns in a direction shown by the arrow adjacent thereto tending to turn the slow-down amplifier a small amount toward "off" to stabilize its operation.

Scale-probes selecting and adjusting potentiometers POT3, POT4, and POT6 are mechanically connected to one another as shown by the broken lines extending therebetween in FIGS. 3b and 3c to rotate in unison when adjusted so that correct adjustments are made in the energizations of predetermined speed-up and slow-down amplifier windings when adjustment is made from all scale to all probes or to an intermediate point. Also, cutoff plate height rheostats RH13 and RH26 and potentiometer POT5 are mechanically connected to one another as shown by the broken line extending therebetween to rotate in unison so that correct adjustments or compensations are made in the energizations of predetermined speed-up and slow-down amplifier windings when these rheostats and potentiometer are adjusted following adjustment of cutoff plate 14 up or down. Moreover, operating speed compensator rheostats RH14, RH21 and RH22 are mechanically connected to manual speed setter potentiometer POT7 hereinafter described as shown by the broken line extending therebetween in FIGS. 3b and 3c to rotate in unison so that whenever the manual speed setter is adjusted during automatic operation to match the manual signal to the automatic signal, the operating speed compensators concurrently are adjusted in correct direction and amount to maintain system operational stability if the ratio of control by the scale and probes changes or is changed.

Means are provided in FIGS. 3c and 3d for testing operation of the system in the absence of material embedding the probes. This means comprises a plurality of manually operable test circuits for establishing connections bypassing the respective measuring probes to conductor L5. These test circuits comprise a plurality of test-auto switches TA1 through TA6 individually operable when closed to connect resistors R14 through R19 between negative conductor L5 and the respective measuring probes P1 through P6. As will be apparent, resistors R14 through R19 simulate the material resistances between the respective measuring probes and negative conductor L5 to afford operation of the system when material is not present at the probes. Resistors R14 through R19 are given low resistance values of the order of 2500 ohms each relative to the resistance values of resistors R8 through R13 and taper rheostats RH15–17 and RH23–25 which are given relatively higher resistance values of the order of fifteen kilohms per branch comprising a resistor and a taper rheostat whereby connection or disconnection of one or more resistors R14 through R19 in circuit exhibits the proper effect on the mixing amplifiers.

Means are provided in FIG. 3b for operating the system under manual control. These means comprise a manual speed-setter potentiometer POT7, a resistor R20, the aforementioned manual to automatic transfer switching circuit MAT and a manual to automatic operation selector switch SS. The resistor of potentiometer POT7 and resistor R20 are connected in series in that order from the positive output side of direct current power supply unit PSU to the negative side of the latter. The movable arm of potentiometer POT7 is mechanically connected to the movable arms of rheostats RH14, RH21 and RH22 to rotate in unison therewith. The movable arm of potentiometer POT7 is connected through a normally closed contact 1TR2 of a transfer relay 1TR, resistor R5, reference winding REF of preamplifier PRSX and resistors R21 and R22 to the negative output side of power supply unit PSU. Alternatively, the movable arm of potentiometer POT7 is connectable through normally open contact 1TR4 of relay 1TR, load resistor LR and resistors R23 and R24 to the negative output side of power supply unit PSU to provide a load resistor for the manual control current when the system is under automatic operation. The positive output side of three-mode controller TMC is connected through normally closed contact 1TR3 of transfer relay 1TR, load resistor LR and normally closed contact 2TR2 of transfer relay 2TR to the negative output side of the three-mode controller to provide a load resistor for the automatic control current when the system is under manual operation. The positive output side of the three-mode controller is connectable through normally open contact 1TR1 of relay 1TR, resistor R5, reference winding REF of preamplifier PRSX and normally open contact 2TR1 of transfer relay 2TR to the negative output side of the three-mode controller. The operating coils of transfer relays 1TR and 2TR are energizable in parallel from power supply lines L1 and L2 through power transformer PT4 and the movable contactor and stationary contact AUTO of operation selector switch SS, stationary contact MAN of operation selector switch SS being disconnected. A meter MA such as a micro-ammeter or the like is connected from the junction of resistors R21 and R22 to the junction of resistors R23 and R24 for measuring and indicating the magnitude of any potential difference between the automatic and manual input signal circuits to preamplifier reference winding REF whereby to enable periodic adjustment of potentiometer POT7 for null indication to enable smooth transfer between automatic operation and manual operation as hereinafter described.

The system is also provided with a control circuit CC shown in the lower left-hand portion of FIG. 3a. Control circuit CC affords control of the system from a local control station which may be at the drive motor or from a remote control station which may be a control desk or console a desired distance from the drive motor. Control circuit CC is energized from the secondary winding of power transformer PT2 and is provided with a main contactor M for connecting power from the three-phase source to the power amplifier and for controlling energization of control relay CR. Control circuit CC is also provided with a remote start switch RS and a remote stop switch RST for controlling energization of contactor M from the remote control station. A local start switch LS and a local stop switch LST are provided for controlling energization of contactor M from the local control station. A local-off-remote selector switch LOR is provided with a normally open contact 1 for rendering switch RS effective and is provided with a normally open contact 2 for rendering switch LS effective. Local stop switch LST is connected in series with both start switches so that for reasons of safety the system cannot be started from the remote station while it is being stopped from the local station. Control relay CR is provided with normally open contacts CR1 and CR2 for completing maintaining circuits in shunt of start switches RS and LS, respectively, and normally open contacts CR3 and CR4 in the circuits of the primary windings of transformers PT3 and MST, respectively. The purpose of contacts CR3 and CR4 is to disconnect power from mixing amplifiers SUSX and SDSX and from preamplifier PRSX when the system is stopped to prevent application of reference control currents to level amplifier LSX when the system is subsequently restarted in the event the input signal devices drift while the system is stopped.

As shown in FIG. 4, three-mode controller TMC is provided with an input circuit IC for receiving a unidirectional error input signal voltage which may be between positive ten volts and negative ten volts or the like. Input circuit IC is connected to three signal control circuits comprising a rate action circuit RA, a proportional action circuit PA and a reset action circuit REA. Rate action circuit RA is connected to one input terminal of a differential amplifier DA. Proportional action circuit PA and reset action circuit REA are connected together to another input terminal of differential amplifier DA. Differential amplifier DA is connected to an output amplifier OA and the latter is connected to a load L comprising reference winding REF of preamplifier PRSX. The load is connected to a feedback amplifier circuit FA, the latter is connected to a feedback network FN and the latter is connected to the aforementioned second input terminal of differential amplifier DA. Controller TMC is known as a 3-mode controller and is available on the market, for example, as an Electrik Tel-O-Set, and, therefore, has not been shown in detail to avoid complicating the drawings. A general description of the purpose and operation of controller TMC will hereinafter appear in conjunction with the description of operation of the system.

*Operation*

The operation of the system of FIGS. 3a–3d will now be described. Let it be assumed that three-phase alternating current power is connected to power supply lines L1, L2 and L3 in FIG. 3a. This causes energization of shunt field winding SF of drive motor DM by single-phase full-wave rectified power from lines L2 and L3 which energization may be adjusted at field rheostat FR. More specifically, during each alternate half-cycle of the supply voltage, current flows from the left-hand side of the secondary winding of transformer PT1 through the upper input terminal and positive output terminal of rectifier bridge RB1, field rheostat FR, shunt field winding SF and the negative output terminal and lower input terminal of bridge RB1 to the right-hand side of secondary winding of transformer PT1. On each other alternate half-cycle of the supply voltage, current flows from the right-hand side of the secondary winding of transformer PT1 through the lower input terminal and the positive output terminal of bridge RB1, rheostat FR, shunt field winding SF and the negative output terminal and upper input terminal of bridge RB1 to the left-hand side of the secondary winding of transformer PT1.

Single-phase full-wave rectified current also flows from the positive output terminal of rectifier bridge RB1 through the resistor of potentiometer POT1 to the negative output terminal of bridge RB1. As adjustable portion of the voltage across the resistor of potentiometer POT1 is applied from the movable arm thereof to cause current flow through winding BIAS of amplifier PSX3 and rheostat RH1. This adjustable portion of voltage is also applied from the movable arm of potentiometer POT1 to cause current flow through the movable arm and the upper portion of the resistor of potentiometer POT2 and winding BIAS of amplifier PSX1. This adjustable portion of voltage is further applied to cause current flow through the movable arm of potentiometer POT2 and the lower portion of the resistor of potentiometer POT2 and winding BIAS of amplifier PSX2 in series. The movable arm of potentiometer POT2 may be adjusted to balance the energizations of the bias windings of amplifiers PSX1 and PSX2. Rheostat RH1 may be adjusted to energize the bias winding of amplifier PSX3 in balance with the bias windings of amplifiers PSX1 and PSX2. The bias windings bias amplifiers PSX1, PSX2 and PSX3 to cutoff as shown by the lower arrow in FIG. 5a whereby armature winding A of drive motor DM is effectively deenergized.

The primary winding of transformer PT2 is energized across supply lines L2 and L3. This causes energization of winding BIAS of level amplifier LSX by single-phase full-wave rectified power. More specifically, current flows from the upper end of the secondary winding of transformer PT2 through the right-hand input terminal and the positive output terminal of rectifier bridge RB4, winding BIAS, rheostat RH6 and the negative output terminal and left-hand input terminal of bridge RB4 to the lower end of the secondary winding of transformer PT2. On alternate half-cycles of the supply voltage, current flows from the lower end of the secondary winding of transformer PT2 through the left-hand input terminal and positive output terminal of bridge RB4, winding BIAS, rheostat RH6 and the negative output terminal and right-hand input terminal of bridge RB4 to the upper end of the secondary winding of transformer PT2. Rheostat RH6 may be adjusted so that winding BIAS biases amplifier LSX to cutoff as shown by the lower arrow in FIG. 5b whereby reference windings REF of amplifiers PSX1, PSX2 and PSX3 of the power amplifier are effectively deenergized.

Single-phase full-wave rectified current is also applied from the positive and negative output terminals of rectifier bridge RB4 through rheostat RH8 and winding BIAS of preamplifier PRSX. Rheostat RH8 may be adjusted to cause the bias winding to bias preamplifier PRSX to cutoff as shown by the lower arrow in FIG. 5b.

Single-phase alternating voltage is applied from supply lines L1 and L2 through power transformer PT4 to direct current power supply unit PSU. Power supply unit PSU reduces and rectifies the alternating voltage to afford unidirectional regulated power at its positive and negative output terminals of the order of 48 volts and 4 amperes or the like. Power supply unit PSU may be of known type and the details thereof have not been shown to avoid complicating the drawings.

The positive and negative output terminals of power supply unit PSU are connected to direct current supply conductors L4 and L5, respectively. Current flows from conductor L4 in FIG. 3c through voltage divider resistors R6 and R7 in series to conductor L5. Current also flows from the junction of resistors R6 and R7 through rheostats RH11 and RH12 and winding BIAS of speed-up amplifier SUSX to conductor L5. Such energization of winding BIAS causes the speed-up amplifier to be biased to cutoff as shown by the similarly characterized arrow in FIG. 5c. Current further flows from the junction of resistors R6 and R7 through rheostat RH20 and winding BIAS of slow down amplifiers SDSX to energize such winding and bias slowdown amplifier to cutoff as shown by the lower arrow in FIG. 5d.

Current flows from conductor L4 through the resistor of potentiometer POT3 to conductor L5. As adjustable portion of the unidirectional voltage across the resistor of potentiometer POT3 is applied from the movable arm thereof across the resistor of potentiometer POT5 to cause current flow through the latter to conductor L5. As adjustable portion of the voltage across the resistor of potentiometer POT5 is applied from the movable arm thereof to cause current flow through rheostat RH21 and slowdown auxiliary reference winding SDAR to conductor L5. Such energization of winding SDAR is without immediate effect because power is disconnected at contact CR4 from the power windings of the slow-down amplifier.

Alternating current power is applied from supply lines L1 and L2 in FIG. 3a through transformer PT4 to power translating unit PTU in FIG. 3b. The alternating voltage is rectified and amplified in unit PTU to afford unidirectional voltages from its positive and negative output terminals to three mode controller TMC. Power translating unit PTU is of known type and available on the market with the three mode controller and the details thereof have not been shown to avoid complicating the drawings. The nature of the unidirectional supply voltages applied from unit PTU to the three mode controller are such as are required to supply electron discharge devices in the latter. While only a positive and a negative conductor have been shown as connecting unit PTU to the three mode controller, it will be understood that the conductors shown are representative of any additional conductors supplying different voltages and common conductors.

*Automatic Operation*

Let it be assumed that operation selector switch SS in the left-hand midportion of FIG. 3b is set in its AUTO operating position as shown. As a result, the operating coils of transfer relays 1TR and 2TR are energized. Contact 1TR2 opens to disconnect reference winding REF of preamplifier PRSX and resistor R5 from manual speed setter potentiometer POT7. Contact 1TR4 closes to connect load resistor LR to the manual controller in a circuit extending from the movable arm of potentiometer POT7 through contact 1TR4, load resistor LR and resistors R23 and R24 to the negative output terminal of power supply unit PSU. Contacts 1TR3 and 2TR2 open to disconnect load resistor LR from three mode controller TMC. And contacts 1TR1 and 2TR1 close to connect reference winding REF of preamplifier PRSX and resistor R5 across the positive and negative output terminals of three mode controller TMC.

Referring to FIG. 1, let it be assumed that drive 6 is activated to start incoming conveyor 2 running. As a result, the incoming conveyor conveys material 4 and deposits the latter in a pile in front of cutoff plate 14. The incoming conveyor rotates tachometer generator 10 in unison therewith whereby the tachometer generator supplies a first signal through conductors 10a to load cell LC. This signal is preferably a direct current electrical signal which has a characteristic such an amplitude or the like proportional to the speed of the incoming conveyor. It may be assumed that the amplitude of this signal is proportional to feet of conveyor travel per hour.

Scale 8 weights each unit of incoming conveyor length of material such as each foot of material passing over the scale. This causes scale 8 to strain load cell LC through the mechanical connection 8a to afford a second signal. This second signal is a variable electrical signal and is indicative of the weight of material per unit of incoming conveyor length. It may be assumed that this second signal is proportional in amplitude to tons of material per foot of conveyor travel. These first and second signals are mixed or combined or multiplied in load cell LC or the scale may be caused to modulate the current or voltage supplied to load cell LC from tachometer generator 10 whereby the load cell provides a third or output electrical signal at conductors LCa which is proportional preferably in voltage amplitude to tons of material mix delivered by the incoming conveyor per hour.

Referring to the upper left-hand portion of FIG. 3c, the aforementioned voltage is applied through conductors LCa to converter MC/I. This converter converts the signal incoming thereto from millivolts to current. As a result, current flows from the positive output terminal of the converter through the left-hand portion of the resistor and the movable arm of potentiometer POT4, rheostat RH18 and speed-up scale reference winding SUSR of amplifier SUSX to the negative output terminal of the converter. This current flow energizes winding SUSR for purposes hereinafter described.

Let it be assumed that sinter machine conveyor 12 in FIG. 1 is started when material mix begins to accumulate in front of cutoff plate 14 such that pile 24 increases toward its normal level NL shown in FIG. 3d. To control starting of drive motor DM from the remote station, selector switch LOR in FIG. 3a which preferably is located at the local station is first set to its remote operating position REM whereby to close contact 1 thereof. To start drive motor DM, remote start switch RS is pressed to close the same. This causes energization of the operating coil of contactor M across the secondary winding of transformer PT2 in a circuit extending through stop switch LST, contact 1 of selector switch LOR, stop switch RST and start switch RS. Contactor M closes its contacts M1, M2 and M3 to connect three-phase power to the power amplifier. Contactor M also closes its contact M4 to energize the operating coil of control relay CR across the secondary winding of transformer PT2. Relay CR closes its contact CR1 in shunt of start switch RS to maintain energization of the operating coil of contactor M whereafter start switch RS may be released to allow it to reopen. Relay CR closes its contact CR3 in FIG. 3b to energize the primary winding of transformer PT3 across supply lines L2 and L3 shown in FIG. 3a. Relay CR closes its contact CR4 in FIG. 3b to energize the primary winding of transformer MST from supply lines L1 and L2 through transformer PT4 shown in FIG. 3a.

Alternatively, starting of drive motor DM may be controlled from the local station. To preset the system for local control, selector switch LOR in FIG. 3a must first be set in its local operating position LOC. This causes contact 1 of switch LOR to open if the switch was in position REM or to remain open if the switch was in its neutral position OFF and also causes contact 2 thereof to close. This causes the remote controls to be disconnected and the local controls to be prepared for operation. Pressing of local start switch LS causes energization of the operating coil of contactor M across the secondary winding of transformer PT2, the circuit therefor also extending through stop switch LST and contact 2 of selector switch LOR. Contactor M functions as hereinbefore described. Also, relay CR functions as hereinbefore described except that contact CR2 is now utilized rather than contact CR1, that is, contact CR2 in closing completes a maintaining circuit in shunt of local start switch LS for contactor M whereupon the local start switch may be released to allow it to reopen.

It will be recalled that when power was applied to supply lines L1, L2 and L3 and transformer PT2 was energized to energize windings BIAS of amplifiers LSX and PRSX through rectifier bridge RB4, a voltage is also applied from the secondary winding of transformer PT2 to power windings PW4 of level amplifier LSX. However, as the level amplifier is biased to cutoff, it does not provide an output current to the reference windings of the power amplifier. Also, when contacts M1, M2 and M3 were closed, a three-phase voltage was applied to power windings PW1, PW2 and PW3 of the power amplifier. As power amplifier PSX is biased to cutoff as aforementioned and is not receiving an input signal from level amplifier LSX, it does not provide output power to armature A of the drive motor. When contact CR3 was closed to energize the primary winding of transformer PT3, a voltage was applied from the secondary winding of the transformer to power windings PW5 of preamplifier PRSX. However, the preamplifier is also biased to cutoff so that no output signal is applied therefrom to level amplifier LSX. When contact CR4 was closed to energize the primary winding of transformer MST, a voltage was applied from secondary winding S1 to power windings PW6 of speed-up amplifier SUSX and a voltage was applied from secondary winding S2 to power windings PW7 of slow-down amplifier SDSX. However, the speed-up and slow-down amplifiers were biased to cutoff so that no output voltages are applied therefrom to three mode controller TMC.

The aforementioned energization of slow-down auxiliary reference winding SDAR causes the slow-down amplifier to be turned on a predetermined amount as shown by the similarly characterized arrow in FIG. 5d. This causes the slow-down amplifier to provide an output current to resistor R4. More specifically, current flows from the lower end of transformer secondary winding S2 through the left-hand power winding PW7 and rectifier RE13 of the slow-down amplifier, the upper input terminal and the positive output terminal of rectifier bridge RB7, terminal OT2, resistor R4 and the negative output terminal and the lower input terminal of bridge RB7 to the upper end of secondary winding S2. On each alternate half-cycle of the supply voltage, current flows from the upper end of transformer secondary winding S2 through the lower input terminal and the positive output terminal of bridge RB7, terminal OT2, resistor R4, the negative output terminal and the upper input terminal of bridge RB7 and rectifier RE14 and the right-hand power winding PW7 of the slow-down amplifier to the lower end of secondary winding S2. This current flow causes a predetermined voltage to appear across mixing resistor R4 which is opposed by a counteracting voltage of opposite polarity across mixing resistor R3 as hereinafter described. The magnitude and polarity of any resultant voltage across output terminals OT1 and OT2 will become apparent as the description proceeds.

It may be assumed that scale-probes selecting potentiometer POT4 in FIG. 3c is set at its midpoint. Also, speed-up scale reference winding SUSR was energized as aforementioned. This causes the speed-up amplifier to be turned on a predetermined amount as shown by the similarly characterized arrow in FIG. 5c. This causes the speed-up amplifier to provide an output current to resistor R3. More specifically current flows from the lower end of transformer secondary winding S1 through the left-hand power winding PW6 and rectifier RE11 of the speed-up amplifier, the upper input terminal and the positive output terminal of rectifier bridge RB6, terminal OT1, resistor R3 and the negative output terminal and the lower input terminal of bridge RB6 to the upper end of secondary winding S1. On each alternate half-cycle of the supply voltage, current flows from the upper end of transformer secondary winding S1 through the lower input terminal and the positive output terminal of bridge RB6, terminal OT1, resistor R3, the negative output terminal and the upper input terminal of bridge RB6 and rectifier RE12 and the right-hand power winding PW6 of the speed-up amplifier to the lower end of secondary winding S1. The positive voltage across resistor R3 opposes the negative voltage across resistor R4.

Current also flows from the positive output terminal of rectifier bridge RB6 through rheostat RH10 and feedback winding FB to the negative output terminal of bridge RB6 to energize the feedback winding of speed-up amplifier SUSX. The amount of feedback current may be adjusted by moving the tap of rheostat RH10 to afford sufficient negative ampere-turns in the speed-up amplifier as shown in FIG. 5c to stabilize operation thereof. Current also flows from the positive output terminal of rectifier bridge RB7 through rheostat RH19 and feedback winding FB to the negative output terminal of bridge RB7 to energize the feedback winding of slow-down amplifier SDSX. The amount of feedback current may be adjusted by moving the tap of rheostat RH19 to afford sufficient negative ampere-turns as shown in FIG. 5d to stabilize operation of the slow-down amplifier.

Three mode controller TMC in FIG. 3b, is energized with unidirectional voltages from power translating unit PTU as aforementioned and functions to provide a unidirectional output current of predetermined adjustable value after the input signal voltage thereto from terminals OT1 and OT2 is of zero value and which output current is controllable by an input signal. The three mode controller is constructed so that this no-input-signal output current has a value such that, when applied to control preamplifier PRSX and level amplifier LSX and power amplifier PSX in series, the latter applies a voltage to armature winding A sufficient to operate drive motor DM at a predetermined speed. This predetermined speed of the drive motor and consequently the speed of sinter machine conveyor 12 is preferably slower than the speed required to carry the material away as fast as it is deposited on the sinter machine conveyor. As a result, the material will pile up in front of the cutoff plate and embed measuring probes P1, P2, etc., in sequence.

The output current from three mode controller TMC flows from the positive output terminal thereof through contact 1TR1, resistor R5, winding REF of preamplifier PRSX and contact 2TR1 to the negative output terminal thereof. Such current flow energizes the preamplifier reference winding REF to cause the preamplifier to be turned "on" a predetermined amount as generally indicated by the similarly characterized arrow in FIG. 5b. This causes the preamplifier to provide an operating current to winding REF of level amplifier LSX. More specifically, current flows from the lower end of the secondary winding of transformer PT3 through the left-hand power winding PW5 and rectifier RE9 of the preamplifier, the right-hand input terminal and the positive output terminal of rectifier bridge RB5, winding REF of level amplifier LSX, rheostat RH7 and the negative output terminal and left-hand input terminal of bridge RB5 to the upper end of the secondary winding of transformer PT3. On each alternate half-cycle of the supply voltage, current flows from the upper end of the secondary winding of transformer PT3 through the left-hand input terminal and the positive output terminal of rectifier bridge RB5, winding REF of the level amplifier, rheostat RH7, the negative output terminal and the right-hand input terminal of bridge RB5 and rectifier RE10 and the right-hand power winding PW5 of the preamplifier to the lower end of the transformer secondary winding. The energization of winding REF of level amplifier LSX may be adjusted to a desired amount by moving the tap of rheostat RH7.

Energization of reference winding REF of level amplifier LSX causes the level amplifier to provide output currents to reference windings REF of amplifiers PSX1, PSX2 and PSX3 of power amplifier PSX. For this purpose, current flows from the lower end of the secondary winding of transformer PT2 through the left-hand power winding PW4 and rectifier RE7 of level amplifier LSX and the right-hand input terminal and the positive output terminal of rectifier bridge RB3 and then in a first branch through rheostat RH2 and winding REF of amplifier PSX1, in a second branch through rheostat RH3 and winding REF of amplifier PSX2 and in a third branch through rheostat RH4 and winding REF of amplifier PSX3 and then through the negative output terminal and the left-hand input terminal of bridge RB3 to the upper end of the secondary winding of transformer PT2. On each alternate half-cycle of the transformer secondary voltage, current flows from the upper end of the secondary winding of transformer PT2 through the left-hand input terminal and the positive output terminal of rectifier bridge RB3 and then in three parallel branches through rheostats RH2, RH3 and RH4 and reference windings REF of amplifiers PSX1, PSX2 and PSX3, respectively, and through the negative output terminal and right-hand input terminal of bridge RB3 and rectifier RE8 and right-hand power winding PW4 of level amplifier LSX to the lower end of the secondary winding of transformer PT2. The energizations of windings REF of amplifiers PSX1, PSX2 and PSX3 may be adjusted to desired values by moving the taps of rheostats RH2, RH3 and RH4, respectively.

A predetermined portion of the output current of level amplifier LSX is applied from the positive output terminal of rectifier bridge RB3 through feedback winding FB and rheostat RH5 to the negative output terminal of bridge RB3. The value of this feedback current may be adjusted by the movable tap of rheostat RH5 to afford sufficient negative feedback ampere-turns as shown in FIG. 5b to stabilize the level amplifier operation.

The aforementioned energization of reference windings REF of amplifiers PSX1, PSX2 and PSX3 causes power amplifier PSX to control current flow from power supply lines L1, L2 and L3 to armature A of drive motor DM to start the motor running. To this end, current flows from line L1 through contact M3, the left-hand power winding PW1 and rectifier RE1 of amplifier PSX1, the left-hand input terminal and the positive output terminal of rectifier bridge RB2, armature winding A, the negative output terminal and the center input terminal of bridge RB2, rectifier RE4 and the right-hand power winding PW2 of amplifier PSX2 and contact M2 to line L2. On each alternate half-cycle of phase L1–L2 of the three-phase supply voltage, current flows from line L2 through contact M2, the left-hand power winding PW2 and rectifier RE3 of amplifier PSX2, the center input terminal and the positive output terminal of three-phase rectifier bridge RB2, armature winding A, the negative output terminal and the left-hand input terminal of bridge RB2, rectifier RE2 and the right-hand power winding PW1 of amplifier PSX1 and contact M3 to line L1. In a similar manner, current flows on alternate half-cycles of phase L2–L3 of the supply voltage from lines L2 and L3 through the rectifiers and power windings of amplifiers PSX2 and PSX3 and bridge RB2 and armature winding A. And in a similar manner, current flows on alternate half-cycles of phase L3–L1 of the supply voltage from lines L3 and L1 through the rectifiers and power windings of amplifiers PSX3 and PSX1 and rectifier bridge RB2 and armature winding A. As a result, armature winding A is energized by three-phase full-wave rectified power to start the motor running and to initiate operation of the sinter machine conveyor.

Drive motor DM is mechanically connected to tachometer generator 18 through its shaft or the like as depicted by the broken line in FIG. 1 and in FIGS. 3a and 3b whereby the motor drives the tachometer generator for speed regulation purposes and for other purposes hereinafter described. Rotation of the tachometer generator causes a unidirectional current to flow therefrom through voltage divider resistors R1 and R2. Current also flows from the junction of resistors R1 and R2 through feedback winding FB of preamplifier PRSX and rheostat RH9 to the negative side of the generator. The value of current flowing in the feedback winding of the preamplifier may be adjusted by moving the tap of rheostat RH9 to afford the preamplifier sufficient negative ampere-turns to maintain the speed of the drive motor substantially constant for a constant input signal to the preamplifier.

The feedback signal applied from tachometer generator 18 to the preamplifier feedback winding FB is proportional in current magnitude to the speed of drive motor DM. If the speed of the motor increases, the tachometer generator will increase the ampere-turns of the feedback winding to reduce the output current from the preamplifier. This decrease in preamplifier output current will be reflected through level amplifier LSX and power amplifier PSX to decrease the energization of armature winding A thereby to decrease the speed of the motor to the previous value. If the speed of the motor should decrease from the last mentioned value, the tachometer generator will decrease the ampere-turns of the feedback winding to increase the preamplifier output current. This increase will be reflected through the level amplifier and the power amplifier to increase the energization of armature winding A thereby to cause the motor speed to increase to the previous value. In this manner, one function of tachometer generator 18 is to regulate the speed of the drive motor under varying load or the like.

When the motor drives tachometer generator 18, the latter causes current flow also through the resistor of scale-probes selecting potentiometer POT6. A portion of the voltage across potentiometer POT6 is supplied from the movable arm thereof which may be assumed to be set initially at its midpoint to cause current flow through rheostats RH26 and RH27 and slow-down tachometer reference winding SDTR to the negative side of tachometer generator 18. This current flow energizes winding SDTR and the value thereof may be adjusted by moving the tap of rheostat RH27. The signal applied from the tachometer generator to winding SDTR is proportional to the speed of the drive motor. Winding SDTR develops ampere-turns which are added to the ampere turns of winding SDAR as shown in FIG. 5d to turn the slow-down amplifier still further "on." As a result, the output current from the slow-down amplifier increases and correspondingly increases the negative voltage across mixing resistor R4. This voltage across resistor R4 opposes the positive voltage across resistor R3.

Let it be assumed that the sum of the ampere-turns developed by slow-down auxiliary reference winding SDAR and slow-down tach reference winding SDTR in the slow-down amplifier has an adjusted value such that the output current of the latter causes a negative voltage drop across resistor R4 sufficient to cancel the positive voltage drop across resistor R3 caused by the output current of the speed-up amplifier developed by the ampere-turns of speed-up scale reference winding SUSR as aforementioned. Under this condition, the voltage across output terminals OT1 and OT2 is of zero value so that no input signal or control voltage is applied therefrom to the three mode controller. Under this condition, the speed of the drive motor is determined by the no-input-signal output current value of the three-mode controller which may be controlled as hereinafter described to afford the drive motor the desired speed relative to the rate at which the incoming conveyor delivers material in front of the cutoff plate.

Should the negative voltage drop across resistor R4 be larger than the positive voltage drop across resistor R3 with the aforementioned windings being energized in the speedup and slow-down amplifiers, the system will automatically decrease the speed of the drive motor to a point where the mixing amplifiers are balanced. Mixing resistors R3 and R4 algebraically add the voltages thereacross whereby the resultant negative voltage is applied from terminals OT1 and OT2 to the three-mode controller. This negative input voltage decreases the output current of the three mode controller to decrease the motor speed. As a result, tachometer generator 18 decreases the energization of winding SDTR to reduce the output current of the slow-down amplifier. Thus, the negative voltage across resistor R4 decreases to a value equal to the positive voltage across resistor R3 to balance the outputs of the mixing amplifiers. This discontinues the negative input voltage to the three mode controller. Thereafter, the drive motor continues to run at the new reduced speed under the control of the system regulation.

Three mode controller TMC shown in FIG. 3b which receives control signal voltages from the mixing amplifiers is provided with means for modifying an input signal voltage and for controlling reference winding REF of preamplifier PRSX in accordance with the modified signal. As shown in FIG. 4, this means comprises circuitry affording proportional action, reset action and rate action control of the signal voltage.

Proportional action is defined as determining the relationship of the controller proportional-mode output signal to an input signal, as for example, direct proportionality of the output signal to the input signal. In other words, proportional action is in the nature of amplifier gain and may be adjusted so that the magnitude of the output signal changes a desired amount in response to a given change in the magnitude of the input signal.

Reset action is defined as periodic adjustment of the output signal in response to and as long as an input signal is received. Reset action is in the nature of repetitions per unit of time and may be adjusted to set it at a desired number of repetitions per minute of output signal change. Reset action is based on the integral of the input voltage and causes the output signal to change in such a direction eventually to reduce the input signal to zero. Reset action depends not only on the magnitude of the input signal but also on how long the input signal is applied. A purpose of the reset action is to eliminate "offset" caused by load changes by continuing to change the output until the input decreases to zero value. In order to maintain the controller operating under changes, there will be a certain percentage of "offset," that is, difference between the ultimate condition of the controller and its actual condition. By continuing to change the output signal until the input signal decreases to zero, the reset action eliminates such offset.

Rate action is defined as an anticipation of required control action in response to the rate of change of the input signal. Rate action control is a derivative of the input signal or a differentiating type of control which anticipates changes in deviation of the input signal. The rate action circuit examines the rate at which the input signal is changing and then affords a control signal which slows down the change and prevents the controller output from changing too greatly and which action is adjustable. It also anticipates increasing demand by changing the output faster than would be possible with proportional action alone. As an example, the rate action circuit exhibits a large control action when the input signal changes at a fast rate and exhibits a small or no control action when the input signal changes at a slow rate. In this manner, rate action prevents overshooting whereby the controller is prevented from hunting.

Proportional action circuit PA comprises or is associated with a substantially long time-constant device such as an R-C (resistance-capacitance) circuit or the like in known manner which is arranged to store an adjustable amount of electrical energy. This energy storage device maintains the output current of the three-mode controller substantially at a selected value in the absence of an input signal thereto whereby to maintain the drive motor running at the aforementioned preadjusted speed. A positive input signal to the three mode controller increases this energy storage whereby to increase the output of the controller causing a corresponding increase in motor speed. Conversely, a negative input signal to the three mode controller decreases this energy storage whereby to decrease the output of the controller causing a corresponding decrease in motor speed. In view of the substantially long time-constant of the energy storage device, such energy is discharged or leaks off at a relatively slow rate whereby the motor speed remains substantially at the new value following each such change therein.

The input signal or a portion thereof, when modified by proportional action and reset action, is applied to a first input terminal of a differential amplifier. That is, the output signals or controls of proportional action circuit PA and reset action circuit REA are combined as shown in FIG. 4 and applied to the first input side of differential amplifier DA. The incoming signal, when acted upon by rate action, is applied to the other input terminal of the differential amplifier. As shown in FIG. 4, the output signal terminal of rate action circuit RA is connected to the other input side of differential amplifier DA.

A function of differential amplifier DA is to mix and amplify the two input signals simultaneously and to produce a resultant single output signal. The single output signal of the differential amplifier which incorporates the three modifications of the input signal is then applied to output amplifier OA and amplified therein. In the output amplifier, the signal is converted into an output current having a range of four to twenty milliamperes or the like which is applied to the load comprising reference winding REF of preamplifier PRSX shown in FIG. 3b.

A change in voltage occurring as a result of the aforementioned storage of energy in or discharge of energy from the energy storage device must be balanced by a change of equal but opposite polarity to stabilize the output of the differential amplifier. This balancing voltage is supplied by the action of feedback amplifier FA. A negative feedback signal or voltage is returned from the load circuit as shown in FIG. 4 and is applied by way of feedback amplifier FA and feedback network FN and is then coupled with or combined with the input signal going to the first input terminal of the differential amplifier. The output amplifier OA is an extremely high gain amplifier in order to afford sufficient current to control the reference winding of preamplifier PRSX in response to a small input signal voltage to the three mode controller. This negative feedback signal also insures high stability of the output amplifier and minimizes any variations caused by aging components and by ambient conditions.

When the material piles up in front of the cutoff plate as shown in FIG. 1 and embeds the lower tips of common probes CP1 and CP2 first and measuring probes P1, P2 and P3 then in that order, the material forms electrically conducting paths from the respective measuring probes to common probe CP1. When the lower tips of common probe CP1 and measuring probe P1 have been embedded, current flows from conductor L4 through the right-hand portion of the resistor and the movable arm of potentiometer POT3, rheostats RH13 and RH14, speed-up probe reference winding SUPR, taper rheostat RH15, resistor R8, probe P1, the material mix and probe CP1 to conductor L5. This current flow causes energization of winding SUPR to increase the output current of the speed-up amplifier flowing through resistor R3. The positive voltage drop across resistor R3 preferably is less than the negative voltage drop across resistor R4 whereby the slow-down amplifier maintains the drive motor speed at its minimum or at a low value. That is, the slow-down amplifier holds the motor speed down so that material accumulates in the pile.

The energization of winding SUPR of the speed-up amplifier caused by probe P1 sensing material may be adjusted at taper rheostat RH15. Resistor R8 in series connection with probe P1 is given a relatively high resistance value with respect to the resistance of the material whereby probe P1 effectively senses the engagement of material therewith and is substantially insensitive to increase in contact area between the probe and the material as the pile height rises. Thus, winding SUPR is primarily responsive to detection of material by probe P1 and effect thereon by rise of material between probes P1 and P2 is relatively insignificant.

When the material embeds the lower tip of probe P2, rheostat RH16 and resistor R9 are connected in parallel with rheostat RH15 and resistor R8 to decrease the total resistance in the circuit of speed-up probe reference winding SUPR. This allows increased current flow through winding SUPR whereby to increase the positive voltage across resistor R3. This incremental energization of winding SUPR may be adjusted at taper rheostat RH16. However, the slow-down amplifier still holds the motor speed down as aforementioned to allow the material to accumulate in the pile.

When the material embeds the lower tip of measuring probe P3, rheostat RH17 and resistor R10 are connected in a third parallel circuit between winding SUPR and common probe CP1. This causes a further decrease in the total resistance in the circuit of winding SUPR to permit the current flow therein correspondingly to increase. The positive voltage drop across resistor R3 under these conditions may balance the negative voltage drop across resistor R4 to reduce any voltage across terminals OT1 and OT2 to zero. This increment of positive voltage may be adjusted at rheostat RH17 to afford together with rheostat RH15 and RH16 the desired stepped gradation to the speed-up amplifier output relative to change in the height of the pile of material at the probes.

In accordance with the aforementioned operations, the material has embedded the lower tip of probe P3 and, therefore, has reached its normal level NL shown in FIG. 3d. Assuming that the drive motor is still operating at a slow speed, the material pile height continues to increase. If the pile height increases until the material engages probe P4, winding SDPR of the slow-down amplifier will be energized to decrease the output of the slow-down amplifier. As a result, the positive voltage across resistor R3 exceeds the negative voltage across resistor R4 whereby a positive voltage is applied to the three mode controller to cause the motor speed to increase as hereinafter more fully described.

It having been assumed that scale-probes selecting potentiometers POT3, POT4 and POT6 are initially set in their intermediate positions, it will be apparent that the drive motor speed is controlled partly by a first measuring signal which is proportional to tons per hour of incoming material and partly by a second measuring signal which is proportional to the depth of material in front of the cutoff plate. The first measuring signal is controlled by scale 8 and is applied to speed-up scale reference winding SUSR of the speed-up amplifier. The second measuring signal is controlled by the probes and is applied to speed-up probe reference winding SUPR of the speed-up amplifier only or additionally to slow-down probe reference winding SDPR of the slow-down amplifier as hereinafter described.

If the amount of material delivered by the incoming conveyor or the height of pile 24 varies, the system will automatically adjust the speed of drive motor DM whereby to maintain the height of the pile 24 at its normal level NL.

Considering first the control of the system by the material measuring probes, let it be assumed that the height of the pile rises to engage the lower tip of probe P4. This causes predetermined energization of slow-down probe reference winding SDPR of the slow-down amplifier whereby to increase the speed of the sinter machine conveyor motor and to cause conveyance of the material at a faster rate to decrease the pile height to its normal level. More specifically, current flows from conductor L4 in FIG. 3c through the right-hand portion of the resistor and the movable arm of potentiometer POT3, the left-hand portion of the resistor and the movable arm of potentiometer POT5, rheostat RH22, winding SDPR, rheostat RH23, resistor R11, probe P4, the material and common probe CP2 to conductor L5. Energization of winding SDPR decreases the output current of slow-down amplifier SDSX as shown in FIG. 5d. This causes decrease of the voltage across resistor R4 whereby a positive voltage is applied to three mode controller TMC. As a result, the speed of drive motor DM is increased whereby the material is conveyed at a faster rate to cause decrease of the pile height back to its normal level. Tachometer generator 18 operates in accordance with increase in motor speed to increase the energization of winding SDTR thereby tending to rebalance the mixing amplifiers. When the pile height decreases back to its normal level, probe P4 is disengaged by the material whereby energization of slow-down probe reference winding SDPR is discontinued. This controls the slow-down amplifier to increase its output current whereby to rebalance the mixing amplifiers. The positive output voltage at terminals OT1 and OT2 is reduced to zero value and the motor runs at the new speed until another change in material pile height occurs.

In this connection, it will be apparent that the aforementioned rise in the height of pile 24 may be accompanied by or may be caused by an increase in the weight as well as volume of the material mix delivered by the incoming conveyor per unit of time. Such increase effects a proportional increase in the current applied from load cell LC to speed-up scale reference winding SUSR. This causes an increase in the positive output voltage at terminals OT1 and OT2 and contributes to the aforementioned incremental change in motor speed. However, as the motor speed increases, tachometer generator 18 controls slow-down tach reference winding SDTR to increase the negative voltage across resistor R4. This increase in negative voltage balances the positive voltage across resistor R3 caused by speed-up scale reference winding SUSR and the motor runs at the new speed.

From the foregoing, it will be apparent that probes P4, P5 and P6 control winding SDPR which control is terminated when the pile height returns to its normal level. Also, scale 8 controls winding SUSR which control is canceled when the mixing amplifiers are rebalanced by increased energization of winding SDTR by the tachometer generator.

It will be apparent that if the height of pile 24 continues to increase following detection thereof by probe P4 and increase of the drive motor speed as aforementioned, the pile rise will be detected by probes P5 and P6 in sequence. Parallel circuits through rheostats RH24 and RH25 and resistors R12 and R13 and probes P5 and P6, respectively, will be established to decrease the total resistance of the circuit of winding SDPR in steps. This causes corresponding incremental changes in the drive motor speed and rebalancing of the mixing amplifiers in the manner hereinbefore described whereby to cause the pile height to resume its normal level. The increments of motor speed controlled by probes P4, P5 and P6 may be set by adjusting taper rheostats RH23, RH24 and RH25 to afford the speed change gradation desired with respect to the rate at which the incoming conveyor delivers the material.

Let it be assumed that the pile height decreases rather than increases from the normal level. This causes the system automatically to adjust the drive motor speed whereby to maintain the pile height at its normal level. More specifically, decrease in the pile height causes probe P3 to be disengaged by the material. If the pile height decreases further, probes P2 and P1 are also disengaged in that order. The controls initiated when one or more probes P3, P2 and P1 are disengaged are directly opposite to the controls hereinbefore described when probes P4, P5 and P6 were engaged by rising material. That is, disengagement of probe P3 by the pile causes interruption of the corresponding parallel circuit comprising rheostat RH17 and resistor R10. This causes increase in the total resistance in the circuit of winding SUPR whereby to decrease the current flow in the latter. The corresponding decrease in the output current of the speed-up amplifier affords a negative voltage from terminals OT1 and OT2 to the three mode controller. This causes a decrease in the drive motor speed whereby the material reassumes its normal level. In a similar manner, disengagement of probe P2 may cause a further decrease in the drive motor speed. And disengagement of probe P1 would cause interruption of the circuit of winding SUPR further to decrease the drive motor speed. In response to such decrease of drive motor speed, the energization of winding SDTR is decreased, the pile height resumes its normal level and the former energization of winding SUPR is restored to terminate the probe control.

Considering next the control of the system by scale 8, let it be assumed that the tons of material delivered per hour increases. In this connection, it may be assumed that the incoming conveyor is set to run at a constant speed but that the weight of material per unit length of incoming conveyor varies. Such increase in the weight of material delivered causes an increase in the signal applied from load cell LC through conductors LCa to converter MV/I. This causes a proportional increase in the current flow from the converter through potentiometer POT4, rheostat RH18 and winding SUSR. The speed-up amplifier responds to apply a positive voltage to the three mode controller. As a result, the drive motor speed increases and tachometer generator 18 controls the slow-down amplifier to rebalance the mixing amplifiers whereby the positive voltage at terminals OT1 and OT2 decreases to zero value and the drive motor runs at the new speed.

If the tons of material delivered per hour decreases, a directly opposite control function is initiated to decrease the drive motor speed. More specifically, such decrease in the weight of delivered material effects a decrease in the energization of speed-up scale reference winding SUSR. This causes a negative voltage to be applied to the three mode controller to decrease the motor speed. Again tachometer generator 18 controls winding SDTR to rebalance the mixing amplifiers whereby to terminate the negative output voltage therefrom. After each of the aforementioned adjustments of the motor speed, the motor runs at the new speed until another signal calling for a speed change is applied either from the detecting probes or from the scale or partly from both.

It will be apparent from the foregoing that when the scale-probes selecting and adjusting potentiometers are set at their midpoint as shown in FIGS. 3b and 3c, the system is controlled, that is, the drive motor speed is controlled by both the scale and the probes.

The system affords adjustment of the control to either all scale or all probes or to any ratio of control from the scale and probes within their ranges other than the equal control shown wherein the scale-probes potentiometers are at their midpoints. If it is desired to control the system by the probes alone, potentiometers POT3, POT4 and POT6 are set in their all probes operating positions by turning the same all the way clockwise. This causes potentiometer POT3 in FIG. 3c to apply the the entire voltage appearing across conductors L4 and L5 to the resistor of potentiometer POT5. A portion of this voltage is applied from the movable arm of potentiometer POT5 to winding SUPR of the speed-up amplifier and to windings SDAR and SDPR of the slowdown amplifier.

Scale-probes selecting potentiometer POT6 in FIG. 3b effectively shunts rheostat RH26 and slow-down tach reference winding SDTR for reasons hereinafter described. Scale-probes selecting potentiometer POT4 in FIG. 3c effectively shunts rheostat RH18 and speed-up scale reference winding SUSR to render scale 8 ineffective to afford any control of the system. Under this condition, the output current from converter MV/I flows through the resistor of potentiometer POT4 as a load device therefor. It will therefore be apparent that the scale has been rendered ineffective and that the probes have been given greater control over the mixing amplifiers.

Under all probes control, if the pile height decreases, probe P3 will decrease the energization of winding SUPR whereby the mixing amplifiers will afford a negative output voltage to decrease the motor speed. This decrease in motor speed will run the sinter machine conveyor at a slower rate to permit the material to accumulate to its normal level. When the material again assumes its normal level, probe P3 becomes embedded whereby winding SUPR becomes energized to its previous value to rebalance the mixing amplifiers. The motor then runs at the last mentioned speed as long as the pile height remains at its normal level.

If the pile height should increase so as to embed the lower tip of probe P4, winding SDPR is energized to decrease the output current of the slow-down amplifier. This affords a positive output voltage from the mixing amplifiers to increase the drive motor speed. Thus, the sinter machine conveyor runs at a faster rate to reduce the height of the pile. When the material again assumes its normal level, probe P4 is disengaged by the material to deenergize winding SDPR whereby the mixing amplifiers are rebalanced and the positive output voltage therefrom terminated. Thereafter, the motor runs at the faster speed as long as the pile height remains at its normal level. Thus, control of winding SDTR is not required.

If it is desired to control the system by the scale alone, potentiometers POT3, POT4 and POT6 are set in their all scale operating position by turning the same all the way counterclockwise. This causes potentiometer POT3 in FIG. 3c effectively to shunt the voltage from windings SUPR, SDAR and SDPR. Also, potentiometer POT4 in FIG. 3c applies the entire output voltage appearing across its resistor to cause current flow in winding SUSR. Moreover, potentiometer POT6 in FIG. 3b applies the entire voltage of tachometer generator 18 to cause current flow in winding SDTR. Under this condition, speed-up scale reference winding SUSR controls the speed-up amplifier and slow-down tach reference winding SDTR controls the slow-down amplifier.

In the event the weight of material delivered by the incoming conveyor per unit of time increases, scale 8 detects this and controls load cell LC to increase the energization of speed-up scale reference winding SUSR. This causes the speed-up amplifier to apply a positive voltage whereby to increase the motor speed. Such increase in motor speed causes tachometer generator 18 correspondingly to increase the energization of slow-down tach reference winding SDTR to increase the negative voltage across resistor R4 whereby to rebalance the mixing amplifiers and to terminate the positive voltage output therefrom. The drive motor then runs at the increased speed until another variation occurs in the control signal from the load cell.

In the event the weight of material delivered by the incoming conveyor per unit of time decreases, scale 8 detects this and controls load cell LC to decrease the energization of winding SUSR. This causes the speed-up amplifier output to decrease whereby a negative voltage is applied from terminals OT1 and OT2 to cause the drive motor speed to decrease. Such decrease in motor speed causes tachometer generator 18 correspondingly to decrease the energization of slow-down tach reference winding SDTR to decrease the output of the slow-down amplifier. In this manner, the mixing amplifiers are rebalanced and the negative voltage at terminals OT1 and OT2 is reduced to zero value. The sinter machine then runs at the decreased speed until another change occurs in the control signal from the load cell.

In the description of operation hereinbefore appearing it was assumed that the material in pile 24 was to be maintained at normal level NL shown in FIG. 3d, that is, at a level wherein the lower tip of probe P3 is embedded in the material and the lower tip of probe P4 does not detect material. In order to afford the material which is subjected to the sintering process the proper compactness, it may become necessary to change the level at which the pile height at the probes is maintained. One way to do this is to adjust the probes up or down as required. While this method of adjusting the probes to change the pile height has been employed, it involves certain disadvantages such as, for example, the requirement of an adjustable support for probe support PS and the difficulty and time involved when the machine is stopped to adjust the probes. To overcome these and other disadvantages and to facilitate adjustment of the pile height whether the machine is stopped or running, the invention provides manually adjustable electrical control means therefor. This means comprises material height adjust rheostat RH11 shown in the left-hand portion of FIG. 3c. Rheostat RH11 is in series connection in the energizing circuit of winding BIAS of the speed-up amplifier. Turning rheostat RH11 in the clockwise or HIGHER direction decreases the resistance in the bias winding circuit to increase the current therein. As a result, the speed-up amplifier is biased beyond cutoff as shown by arrow H in FIG. 5c. This causes the output voltage of the speed-up amplifier to decrease whereby a negative input voltage is applied to the three mode controller and the energization of winding REF of preamplifier is decreased. This causes the drive motor to decrease the speed of the sinter machine conveyor whereby material is accumulated to raise the pile height to a desired level depending on the final adjustment of rheostat RH11. When the drive motor speed decreases, tachometer generator 18 decreases the energization of winding SDTR of the slow-down amplifier to rebalance the mixing amplifiers and to terminate the negative output signal therefrom. The drive motor then runs at the lower speed under the control of the three mode controller as hereinbefore described.

In the event rheostat RH11 is turned an amount to cause the pile to embed the lower tip of probe P4, winding SDPR is energized a first increment to decrease the output of the slow-down amplifier. And the decrease in energization of winding SDTR further decreases the output of the slow-down amplifier. These two decreases in output balance the aforementioned decrease in output of the speed-up amplifier to rebalance the mixing amplifiers. The drive motor then continues to run at a slower speed sufficient to maintain the pile height between probes P4 and P5. In a similar manner, rotation of rheostat RH11 selected amounts further clockwise will cause the pile height to rise between probes P5 and P6 or to a level wherein the lower tip of probe P6 is embedded. The respective increases in pile height will cause second and third incremental changes in the energization of winding SDPR and decremental changes in the energization of winding SDTR when the drive motor speed decreases to rebalance the mixing amplifiers. In this manner, the pile height can be increased as desired.

Turning rheostat RH11 in the counterclockwise or LOWER direction increases the resistance in the speed-up amplifier bias winding circuit to decrease the current therein. As a result, the speed-up amplifier bias is decreased as shown by arrow L in FIG. 5c to increase the output of the amplifier. This causes a positive voltage to be applied to the three mode controller whereby the drive motor speed is increased. The material is conveyed at a faster rate and the pile height decreases. Tachometer generarator 18 increases the energization of winding SDTR to rebalance the mixing amplifiers and to decrease the positive voltage therefrom to zero. The drive motor then contines to run at the faster speed to maintain the pile height at the lower level.

In the event rheostat RH11 is turned an amount to cause the material to disengage probe P3, the energization of winding SUPR is decreased to reduce the output voltage of the speed-up amplifier. The difference in output voltage between the mixing amplifiers caused by the changes in energizations of windings BIAS and SUPR of the speed-up amplifier is balanced by the consequent change in energization of winding SDTR of the slow-down amplifier to rebalance the amplifiers. In a similar manner, the pile height can be decreased further by turning rheostat RH11 further counterclockwise.

Cutoff plate 14 in FIG. 1 may be adjusted up or down if it is desired to change the vertical thickness of the material conveyed beneath the ignition furnace. It will be apparent that if the cutoff plate is raised, it becomes necessary to slow down the sinter machine conveyor in order to maintain the pile height at the selected level. This is done by turning cutoff plate height adjust compensating rheostats RH13 and RH26 and potentiometer POT5 in the counterclockwise maximum direction. These compensating rheostats and potentiometer are mechanically connected to one another for rotation in unison and preferably are calibrated and marked in inches from a minimum cutoff plate position to a maximum cutoff plate position to facilitate manual setting thereof. As shown by the broken lines and legends in FIGS. 1 and 3c, cutoff plate adjust rheostats RH13 and RH26 and potentiometer POT5 may preferably also be mechanically connected to the cutoff plate or its adjusting drive mechanism. In this manner, adjustment of the cutoff plate up or down will concurrently cause the cutoff plate adjust compensator rheostats and potentiometer to be adjusted in correct amount and direction to cause the required change in drive motor speed.

The aforementioned adjustment of rheostat RH13 decreases the resistance and increases the current in the circuit of winding SUPR of the speed-up amplifier. This increases the output of the speed-up amplifier to provide an increment of positive voltage to the three mode controller. Adjustment of potentiometer POT5 as aforesaid increases the energization of winding SDAR to increase the output of the slow-down amplifier to provide a first increment of negative voltage to the three mode controller. Assuming that pile 24 is being maintained at its normal level NL or lower, the circuit of winding SDPR is open at the probes and this winding will not be affected by such adjustment of potentiometer POT5. Adjustment of rheostat RH26 as aforesaid increases the energization of winding SDTR to increase the slow-down amplifier output to provide a second increment of negative voltage to the three mode controller. The resultant negative voltage from the mixing amplifiers decreases the speed of the drive motor sufficiently to maintain the height of the material pile at its normal level.

In the event the pile height is being maintained above its normal level so that the lower tips of one or more probes P4, P5 and P6 are embedded, the aforementioned adjustment of potentiometer POT5 also increases the energization of winding SDPR to decrease the output of the slow-down amplifier a predetermined amount. The ampere-turns of winding SDPR subtract a portion of the slow-down amplifier output provided by increased energization of windings SDAR and SDTR because the decrease in drive motor speed required when the material is being maintained above normal level NL is not as great as the decrease in motor speed required when the material is being maintained at the normal level. This is for the reason that the height of the larger volume of material at the cutoff plate changes at a slower rate.

In the event the pile height is being maintained below its normal level so that the lower tips of one or more probes P3, P2 and P1 are disengaged from the material mix, the aforementioned adjustment of rheostat RH13 counterclockwise effects a small amount of increase in the current in winding SUPR to provide a larger negative voltage from the mixing amplifiers. This causes a larger decrease in drive motor speed. In order to maintain the material at the selected level following raising of the cutoff plate, the decrease in drive motor speed required when the material is being maintained below normal level NL is greater than that required when the material is being maintained at the normal level. This is for the reason that the height of a smaller pile of material at the cutoff plate changes faster.

It will be apparent that if the cutoff plate is lowered, it becomes necessary to speed up the sinter machine conveyor in order to maintain the pile height at the selected level if the material is delivered thereto at a substantially constant rate. This is done by turning rheostats RH13 and RH26 and potentiometer POT5 in the clockwise minimum direction. Rheostat RH13 decreases the energization of winding SUPR to decrease the output of the speed-up amplifier whereby to provide an increment of negative voltage to the three mode controller. Potentiometer POT5 decreases the energization of winding SDAR to decrease the output of the slow-down amplifier whereby to provide a first increment of positive voltage to the three mode controller. Rheostat RH26 decreases the energization of winding SDTR to decrease the output of the slow-down amplifier whereby to provide a second increment of positive voltage to the three mode controller. Assuming that the pile is being maintained at its normal level NL, potentiometer POT5 will not affect winding SDPR, the circuit of the latter being open at the probes. The resultant positive voltage from the mixing amplifiers increases the speed of the drive motor sufficiently to maintain the pile at its normal level.

In the event the pile height is being maintained above its normal level, clockwise adjustment of potentiometer POT5 also decreases the energization of winding SDPR to increase the output of the slow-down amplifier. This increase in amplifier output is subtracted from the larger decrease in amplifier output provided by windings SDAR and SDTR whereby to reduce the sum of the two increments of positive voltage because the motor speed increase required at higher pile level is less than that required at normal pile level. This is for the reason that the height of the larger pile changes at a slower rate with a constant rate of delivery of material thereto.

In the event the pile height is being maintained below its normal level so that the lower tips of one or more probes P3, P2 and P1 are disengaged from the material, clockwise adjustment of rheostat RH13 effects a smaller amount of decrease in the energization of winding SUPR whereby the resultant positive voltage provided by the mixing amplifiers is higher than it is at normal material level. This causes a larger increase in drive motor speed. In order to maintain the material at the selected level following lowering of the cutoff plate, the increase in drive motor speed required when the material is being maintained below normal level is greater than that required when the material is being maintained at the normal level. This is for the reason that the height of a smaller pile of material at the probes changes faster.

As aforementioned, during automatic operation of the system, load resistor LR in FIG. 3b is connected across the manual control voltage supply. That is current flows from the positive output terminal of power supply unit PSU through the right-hand portion of the resistor and the movable arm of manual speed setter potentiometer POT7, contact 1TR4, load resistor LR and resistors R23 and R24 to the negative output terminal of unit PSU. This current flow establishes a certain voltage level at the junction of resistors R23 and R24. Also during automatic operation, the output current of three mode controller TMC establishes a certain voltage level at the junction of contact 2TR1 and winding REF of preamplifier PRSX. It will be apparent that if these voltage levels differ from one another, transfer of the system from automatic to manual operation will cause a change in the energization of preamplifier winding REF and a consequent change in drive motor speed.

To avoid such change in drive motor speed when transferring from automatic to manual operation, provision is made for indication and adjustment of the aforementioned voltage levels. It will be apparent that whenever such difference in voltage levels is present, current will flow in the circuit extending through micro-ammeter MA and resistor R21. Meter MA indicates this difference whereupon the operator periodically adjusts the system for null or zero indication on the meter. This adjustment is made by manually adjusting operating speed compensator rheostats RH14, RH21 and RH22 in FIG. 3c in the required direction. These compensator rheostats are mechanically connected to one another and to manual speed setter potentiometer POT7 in FIG. 3b for rotation in unison.

Let it be assumed that the material mix is at its normal level NL so that the circuit of winding SDPR of the slow-down amplifier is open at the probes. Under this condition, adjustment of rheostat RH22 will have no effect. Adjustment of rheostats RH14 and RH21 in the clockwise maximum direction will cause increased energization of windings SUPR and SDAR. Winding SUPR will provide an increment of positive voltage and winding SDAR will provide an increment of negative voltage at output terminals OT1 and OT2. If it is assumed that these voltage increments are equal, no change will occur in the output current from the three mode controller. Concurrent adjustment of potentiometer POT7 in the clockwise maximum direction will increase the voltage drop across resistor R24 thereby to render the junction of resistors R23 and R24 more positive.

Adjustment of rheostats RH14 and RH21 in the counterclockwise minimum direction will cause decreased energization of windings SUPR and SDAR. Winding SUPR will provide a decrement of positive voltage and winding SDAR will provide a decrement of negative voltage at output terminals OT1 and OT2. If it is assumed that these voltage decrements are equal, no change will occur in the output current from the three mode controller. Concurrent adjustment of potentiometer POT7 in the counterclockwise minimum direction will decrease the voltage drop across resistor R24 thereby to render the junction of the resistors R23 and R24 more negative.

It will be apparent from the foregoing that periodic adjustment of the manual speed setter in conjunction with adjustment of the operating speed compensators whenever meter MA exhibits a voltage difference as aforesaid will maintain the control voltages of the automatic and manual controls at a level whereby the system can be transferred from automatic to manual operation and that such transfer will not initiate a change in speed of the drive motor. It will be apparent that adjustment of the scale-probes selecting potentiometers toward their all probes operating positions causes increased energizations of windings SUPR and SDAR and decreased energizations of windings SUSR and SDTR. Alternatively, adjustment thereof toward their all scale operating positions causes decreased energizations of windings SUPR and SDAR and increased energizations of windings SUSR and SDTR. The change in energization of winding SUSR will offset at least to some extent the change in energization of winding SUPR in the speed-up amplifier. Also, the change in energization of winding SDTR will offset at least to some extent the change in energization of winding SDAR in the slow-down amplifier. Assuming that there is a positive resultant output voltage from the mixing amplifiers as a result of the adjustment toward all probes and a negative resultant output voltage as a result of the adjustment toward all scale, the resultant changes in voltages between the automatic and manual control circuits will be indicated by meter MA. This will alert the operator to make the periodic adjustment of the operating speed compensators. It will be apparent from the foregoing that the operating speed compensators, when adjusted, perform the dual function of facilitating maintenance of balance between the automatic and manual control voltages and of operational stability when the scale-probes selectors are adjusted. In this connection it will be apparent that any net output voltage from the mixing amplifiers caused by adjustment of the scale-probes selecting potentiometers is an unwanted voltage because such adjustment normally would not necessitate a change in motor speed. Also, there is the possibility that the scale signal might change a substantial amount due to certain conditions whereas a proportional speed change is not required. This could cause the mixing amplifiers to operate at an output level far removed from the proper output level at which they should operate for the speed at which the motor should be maintained. This is due to the fact that the scale does not know the motor speed but instead responds to conditions at the incoming conveyor which are unaffected by motor speed. Under these conditions, the result, if not compensated for, is that the system will not regulate at or near the motor speed as it preferably should but instead will regulate as if the motor speed is some value other than its actual value. This would normally require a separate manual adjustment in addition to the adjustment performed on the manual speed setter. However, by connection of the operating speed compensator rheostats to the manual speed setter for rotation therewith in the correct manner, the compensators are concurrently adjusted to accomplish the required compensation. That is, the periodic adjustment of the manual speed setter as aforementioned causes the operating speed compensators to adjust the output level of the mixing amplifiers so that the system will regulate at or very near the then speed of the motor. Thus, these periodic adjustments inherently accomplish the additional function of maintaining system operational stability.

Normally, the operating speed compensator rheostats are adjusted so that the output voltages of the speed-up and slow-down amplifiers are balanced. These rheostats are thereafter periodically adjusted during automatic operation to maintain the automatic and manual control voltages at the same level as indicated on meter MA.

To transfer the system to manual control, switch SS in FIG. 3b is moved to its MAN operating position. This causes deenergization of the operating coils of transfer relays 1TR and 2TR to restore the contacts thereof to the normal positions shown under spring action or the like. Contacts 1TR1 and 2TR1 disconnect three mode controller TMC from winding REF of preamplifier PRSX. Contact 1TR4 disconnects load resistor LR from manual speed setter potentiometer POT7. Contacts 1TR3 and 2TR2 connect load resistor LR to the three mode controller. And contact 1TR2 connects the reference winding of preamplifier PRSX to the manual control. That is, contact 1TR2 completes a circuit from the movable arm of potentiometer POT7 to resistor R5 and therethrough and through winding REF and resistors R21 and R22 to the negative output terminal of power supply unit PSU. As a result, resistor LR functions as a load for the output current from the three mode controller and manual speed setter potentiometer POT7 becomes operative to control preamplifier PRSX whereby to control the drive motor speed.

To stop the sinter machine drive motor, stop switch RST is momentarily pressed if the system is being controlled from the remote station or stop switch LST is momentarily pressed if the system is being controlled from the local station. Pressing of the appropriate stop switch causes restoration of contractor M to reopen its contacts. Contact M4 causes restoration of relay CR to reopen its contacts. As a result, power is disconnected from the motor armature winding to stop the motor. Also, power is disconnected from transformers PT3 and MST. Thus, the system is restored to its normal condition.

While the system hereinbefore described is effectively adapted to fulfill the objects stated, it is to be understood that we do not intend to confine our invention to the particular preferred embodiment of material handling control system disclosed, inasmuch as it is susceptible of various modifications without departing from the scope of the appended claims.

We claim:

1. In an electric motor control system, a source of first control signal, a source of second control signal, and control means for controlling operation of the motor comprising first means responsive to said first control signal for controlling operation of said motor independently of said second control signal, second means responsive to said second control signal for controlling operation of said motor independently of said first control signal, and adjustable means electrically connected with said first and second control signal sources and said first and second means for selecting a predetermined ratio of said first and second control signals for control of the respective first and second means whereby the latter jointly control operation of said motor in accordance with the selected ratio of control signals.

2. The invention defined in claim 1, wherein said adjustable means comprises means operative when adjusted in one direction for increasing the magnitude of one of said control signals and for correspondingly decreasing the magnitude of the other of said control signals and being operative when adjusted in the other direction for decreasing the magnitude of said one control signal and for correspondingly increasing the magnitude of said other control signal whereby to adjust the proportionality of control said signals impose on operation of the motor.

3. In an electric motor control system, a source of first control signal, means for varying the magnitude of said first control signal in proportion to a variable external condition, a source of second control signal, and control means for controlling the speed of the motor comprising first means responsive to the magnitude of said first control signal, second means responsive to the magnitude of said second control signal, means responsive to said first and said second means for providing a resultant control signal, means responsive to said resultant control signal for controlling the speed of the motor, means providing a controllable condition for maintenance at a predetermined value, said controllable condition being controlled partly by said external condition and partly by the speed of the motor, and means responsive to variation in said controllable condition for varying the magnitude of said second control signal an amount and in a direction effecting change in motor speed to restore said controllable condition to its predetermined value.

4. The invention defined in claim 3, wherein said means responsive to said first and second means comprises means adjustable to set said controllable condition to a different value whereupon said second control signal varying means becomes effective to initiate a change in motor speed to cause said controllable condition to assume and to be maintained at said different value.

5. The invention defined in claim 3, together with means for adjusting the successive changes in magnitude proportionality in said second control signal caused by respective changes in said controllable condition.

6. In a motor control system for a material processing device of the type having a dispensing conveyor for conveying material comprised of irregularly shaped and sized particles, which material is continuously being discharged from an incoming conveyor onto a receiving end of the dispensing conveyor, said dispensing conveyor being provided with a cutoff plate arranged thereover for limiting the vertical depth of the material dispensed thereby, and said cutoff plate being on the downstream side of the receiving point for the material whereby the material discharged from the incoming conveyor accumulates in a pile against the front face of the cutoff plate, the improvement including automatic control means comprising means associated with the incoming conveyor for providing a first control signal proportional to the weight of incoming material delivered per unit of time, said first control signal being subject to variation in response to variation in the weight of material delivered per unit of time, pile height detecting means for providing a second control signal proportional to the height of the material in the pile, said second control signal being subject to variation in response to variation in the height of the pile, means for combining said first and second signals to provide a resultant signal in response to either one or both of the aforementioned variations, means responsive to said resultant signal for adjusting the speed of the motor to maintain the pile height at a normal level, and means comprising adjustable electrical control means for readily adjusting the relative proportions of said first and second control signals applicable to said combining means.

7. The invention defined in claim 6, wherein said adjustable electrical control means comprises means for selecting any desired ratio of said first and second control signals within the ranges thereof for application to said combining means to adjust the speed of the motor.

8. The invention defined in claim 6, wherein said combining means comprises unbalanceable means operable when unbalanced by said first and second control signals to provide said resultant signal whereby to adjust the speed of the motor, and said resultant signal responsive means comprises means for maintaining the motor at the adjusted speed for a substantially long period of time following termination of said resultant signal.

9. The invention defined in claim 8, together with feedback signal means responsive to the motor speed for controlling said combining means to rebalance the latter and to terminate said resultant signal in response to said adjustment of the motor speed.

10. The invention defined in claim 6, wherein said combining means comprises unbalanceable means operable when unbalanced by said first and second control signals to provide said resultant signal whereby to adjust the motor speed, and operating speed compensator means presettable to balance said combining means for zero resultant signal output when the motor is running at a speed which maintains the pile height at its normal level.

11. The invention defined in claim 6, together with means providing for adjustment of said cutoff plate whereby to change the depth of material conveyed by said dispensing conveyor, such adjustment of the cutoff plate requiring a compensating change in motor speed to maintain the pile height at the normal level, and cutoff plate height adjust compensator means for adjusting said second control signal whereby to adjust the motor speed sufficiently to maintain the pile height at the normal level following adjustment of said cutoff plate.

12. The invention defined in claim 6, together with a load resistor, manual control means for normally applying a manual control signal to said load resistor, coupling means comprising an indicator connected between said load resistor and said resultant signal responsive means for indicating any voltage difference between said resultant signal and said manual control signal during automatic operation of the control system, an adjustable speed setter for adjusting said manual control signal, and operating speed compensator means for adjusting said second control signal applied to said mixing means, said operating speed compensator means being connected to said speed setter to adjust the latter in unison therewith in a direction to decrease any voltage difference between said resultant signal and said manual control signal, and said operating speed compensator means being arranged for periodic adjustment during automatic operation of the system whenever said indicating means indicates such voltage difference thereby to maintain the system in readiness for transfer from automatic to manual control without causing when so transferred a change in motor speed.

13. The invention defined in claim 12, wherein said adjustable electrical control means comprises means effective when adjusted for increasing one of said control signals and concurrently decreasing the other control signal, such adjustment of said electrical control means having a tendency to upset the system operational stability, and said operating speed compensator means being additionally effective when adjusted to restore such system operational stability.

14. The invention defined in claim 6, together with means for testing operation of said system in the absence of material incoming thereto, said testing means comprising a plurality of individually and selectively operable testing devices connectable in shunt of said pile height detecting means for providing electrical signals which simulate a respective plurality of pile heights.

15. The invention defined in claim 6, wherein said pile height detecting means comprises a plurality of electrically conducting probes having their lower tips arranged at different heights above said dispensing conveyor whereby the tips of some of said probes are embedded by the material in accordance with the height of the pile, and the material completes electrical connections to said probes to control the magnitude of said second control signal as a function of the height of the pile, and means in circuit with said probes for rendering said probes contact sensitive whereby said probes and the second control signal providing means associated therewith are primarily sensitive to physical and electrical engagement and disengagement between the material and probes when the pile height varies and are relatively insensitive to variation of area of engagement therebetween.

16. In a motor control system having an electrical power supply source and means for adjusting the power supplied from the source to the motor to control the speed thereof:
- a first control signal source comprising means providing a first electrical control signal which varies in proportion to a first variable external condition having a first varying characteristic;
- a second control signal source comprising means providing a second electrical control signal which varies in proportion to a second variable external condition having a different varying characteristic;
- control means responsive to said first and second control signals for controlling said power adjusting means to adjust the speed of the motor;
- and unitary selecting means operable to select a desired ratio of said first and second control signals for application to said control means and being effective when operated to increase one of said control signals and simultaneously and proportionately to decrease the other of said control signals.

17. The invention defined in claim 16, wherein said unitary selecting means comprises continuously adjustable means operable when adjusted to select any desired ratio of said first and second control signals within the ranges thereof for application to said control means whereby the motor is controlled in desired proportions by said control signals.

18. The invention defined in claim 16, wherein said unitary selecting means comprises means for selecting either said first control signal or said second control signal in its entirety for control of said control means and for concurrently rendering the other control signal ineffective whereby said selected control signal is operative to control the motor independently of the other control signal.

19. The invention defined in claim 16, wherein said control means comprises means for combining said first and second control signals and for controlling the motor in accordance with the resultant signal.

20. The invention defined in claim 16, together with means responsive to operation of the motor for controlling a characteristic of said second external condition.

21. The invention defined in claim 16, together with means jointly responsive to said first external condition and to operation of the motor for controlling a characteristic of said second external condition.

References Cited in the file of this patent

UNITED STATES PATENTS

| | | |
|---|---|---|
| 2,962,150 | Haley et al. | Nov. 29, 1960 |
| 2,969,227 | Ludwig | Jan. 24, 1961 |
| 2,990,937 | Goslin | July 4, 1961 |